US012643174B2

(12) United States Patent
Ohga

(10) Patent No.: US 12,643,174 B2
(45) Date of Patent: Jun. 2, 2026

(54) ALIGNMENT ADJUSTER AND METHOD FOR MANUFACTURING ELECTRONIC DEVICES

(71) Applicant: Gigaphoton Inc., Tochigi (JP)

(72) Inventor: Hitoshi Ohga, Oyama (JP)

(73) Assignee: Gigaphoton Inc., Tochigi (JP)

( * ) Notice: Subject to any disclaimer, the term of this patent is extended or adjusted under 35 U.S.C. 154(b) by 877 days.

(21) Appl. No.: 18/053,452

(22) Filed: Nov. 8, 2022

(65) Prior Publication Data

US 2023/0066377 A1 Mar. 2, 2023

Related U.S. Application Data

(63) Continuation of application No. PCT/JP2020/022347, filed on Jun. 5, 2020.

(51) Int. Cl.
*B23K 26/042* (2014.01)
*B23K 26/064* (2014.01)
*B23K 26/10* (2006.01)

(52) U.S. Cl.
CPC ........ *B23K 26/043* (2013.01); *B23K 26/0643* (2013.01); *B23K 26/10* (2013.01)

(58) Field of Classification Search
CPC .. B23K 26/043; B23K 26/0643; B23K 26/10; G02B 7/1821; G03F 7/20; H01S 3/10
See application file for complete search history.

(56) References Cited

U.S. PATENT DOCUMENTS 6,940,582 B1 * 9/2005 Tanaka .................... H01J 37/20
355/75
6,973,111 B2 12/2005 Yamashita et al.
(Continued)

FOREIGN PATENT DOCUMENTS

CN 1854801 A 11/2006
CN 218783348 U 3/2023
(Continued)

OTHER PUBLICATIONS

International Search Report issued in PCT/JP2020/022347; mailed Aug. 25, 2020.
(Continued)

*Primary Examiner* — Elizabeth M Kerr
*Assistant Examiner* — Keith Brian Assante
(74) *Attorney, Agent, or Firm* — Studebaker Brackett PLLC

(57) ABSTRACT

An alignment adjuster includes a first holder made of a first material and configured to support an optical element, a first adjuster including a first expandable/contractable section made of a second material different from the first material and configured to rotate the first holder and the optical element around a first axis by adjusting the length of the first expandable/contractable section with the first expandable/contractable section being in contact with the first holder, and a first support member made of the second material and configured to support the first adjuster, and the first adjuster is configured to be capable of adjusting the position where the first expandable/contractable section and the first holder are in contact with each other to be located in a first plane containing a first end section of the first support member and the first axis.

19 Claims, 18 Drawing Sheets

(56) References Cited

U.S. PATENT DOCUMENTS

| | | | |
|---|---|---|---|
| 2004/0027562 A1 | 2/2004 | Otsuka et al. | |
| 2005/0015790 A1 | 1/2005 | Yoshizawa | |
| 2006/0245462 A1 | 11/2006 | Takeda | |
| 2007/0091968 A1 | 4/2007 | Wakabayashi et al. | |
| 2008/0181262 A1* | 7/2008 | Wakabayashi ........ | G03F 7/2006 |
| | | | 372/9 |
| 2012/0228525 A1 | 9/2012 | Moriya et al. | |
| 2013/0208742 A1 | 8/2013 | Mizoguchi et al. | |
| 2018/0217501 A1* | 8/2018 | Duan ................... | G03F 7/7045 |

FOREIGN PATENT DOCUMENTS

| | | |
|---|---|---|
| JP | 2002-164592 A | 6/2002 |
| JP | 2008-016544 A | 1/2008 |
| JP | 2010-118518 A | 5/2010 |
| JP | 2012-175006 A | 9/2012 |
| JP | 2012-199512 A | 10/2012 |
| JP | 2015-092591 A | 5/2015 |
| WO | 2004/095661 A1 | 11/2004 |

OTHER PUBLICATIONS

International Preliminary Report on Patentability issued in PCT/
JP2020/022347; issued Dec. 6, 2022.
An Office Action; mailed by the China National Intellectual Property Administration of the People's Republic of China on Sep. 15, 2024, which corresponds to Chinese Patent Application No. 202080100985.9 and is related to U.S. Appl. No. 18/053,452.

* cited by examiner

ALIGNMENT ADJUSTER AND METHOD FOR MANUFACTURING ELECTRONIC DEVICES

CROSS-REFERENCE TO RELATED APPLICATIONS

The present application is a continuation application of International Application No. PCT/JP2020/022347, filed on Jun. 5, 2020, the entire contents of which are hereby incorporated by reference.

BACKGROUND

1. Technical Field

The present disclosure relates to an alignment adjuster and a method for manufacturing electronic devices.

2. Related Art

In recent years, a semiconductor exposure apparatus is required to improve the resolution thereof as semiconductor integrated circuits are increasingly miniaturized and highly integrated. To this end, reduction in the wavelength of light outputted from a light source for exposure is underway. For example, a KrF excimer laser apparatus, which outputs laser light having a wavelength of about 248 nm, and an ArF excimer laser apparatus, which outputs laser light having a wavelength of about 193 nm, are used as a gas laser apparatus for exposure.

The light from spontaneously oscillating KrF and ArF excimer laser apparatuses has a wide spectral linewidth ranging from 350 to 400 pm. A projection lens made of a material that transmits ultraviolet light, such as KrF and ArF laser light, therefore produces chromatic aberrations in some cases. As a result, the resolution of the projection lens may decrease. To avoid the decrease in the resolution, the spectral linewidth of the laser light outputted from the gas laser apparatus needs to be narrow enough to make the chromatic aberrations negligible. To this end, a line narrowing module (LNM) including a line narrowing element (such as etalon and grating) is provided in some cases in a laser resonator of the gas laser apparatus to narrow the spectral linewidth. A gas laser apparatus providing a narrowed spectral linewidth is hereinafter referred to as a narrowed-line gas laser apparatus.

CITATION LIST

Patent Literature

[PTL 1] U.S. Pat. No. 6,973,111
[PTL 2] US-A-2005/015790

SUMMARY

An alignment adjuster according to an aspect of the present disclosure includes a first holder made of a first material and configured to support an optical element, a first adjuster including a first expandable/contractable section made of a second material different from the first material and configured to rotate the first holder and the optical element around a first axis by adjusting a length of the first expandable/contractable section with the first expandable/contractable section being in contact with the first holder, and a first support member made of the second material and configured to support the first adjuster, and the first adjuster is configured to be capable of adjusting a position where the first expandable/contractable section and the first holder are in contact with each other to be located in a first plane containing a first end section of the first support member and the first axis.

An alignment adjuster according to another aspect of the present disclosure includes a first holder made of a first material and configured to support an optical element, a first adjuster including a first expandable/contractable section made of a second material different from the first material and configured to rotate the first holder and the optical element around a first axis by adjusting a length of the first expandable/contractable section with the first expandable/contractable section being in contact with the first holder, a first support member made of the second material and configured to support the first adjuster, a second holder made of the first material and configured to support the first holder at the first axis and further support the first support member at a first end section of the first support member, a second adjuster including a second expandable/contractable section made of the second material and configured to rotate the second holder, the first holder, and the optical element around a second axis that intersects with the first axis by adjusting a length of the second expandable/contractable section with the second expandable/contractable section being in contact with the second holder, and a second support member made of the second material and configured to support the second adjuster, and the first end section is located in a fifth plane containing the first axis and the second axis.

A method for manufacturing electronic devices according to an aspect of the present disclosure includes generating pulse laser light by using a laser apparatus, outputting the pulse laser light to an exposure apparatus, and exposing a photosensitive substrate to the pulse laser light in the exposure apparatus to manufacture the electronic devices, the laser apparatus includes an alignment adjuster including a first holder made of a first material and configured to support an optical element, a first adjuster including a first expandable/contractable section made of a second material different from the first material and configured to rotate the first holder and the optical element around a first axis by adjusting a length of the first expandable/contractable section with the first expandable/contractable section being in contact with the first holder, and a first support member made of the second material and configured to support the first adjuster, the first adjuster configured to be capable of adjusting a position where the first expandable/contractable section and the first holder are in contact with each other to be located in a first plane containing a first end section of the first support member and the first axis.

BRIEF DESCRIPTION OF THE DRAWINGS

Embodiments of the present disclosure will be described below only by way of example with reference to the accompanying drawings.

FIG. 2C is a cross-sectional view taken along the line IIC-IIC in FIG. 2A.

FIG. 3B is a cross-sectional view taken along the line IIIB-IIIB in FIG. 3A.

FIG. 4B is a cross-sectional view taken along the line IVB-IVB in FIG. 4A.

DETAILED DESCRIPTION

Contents

Figure 1:
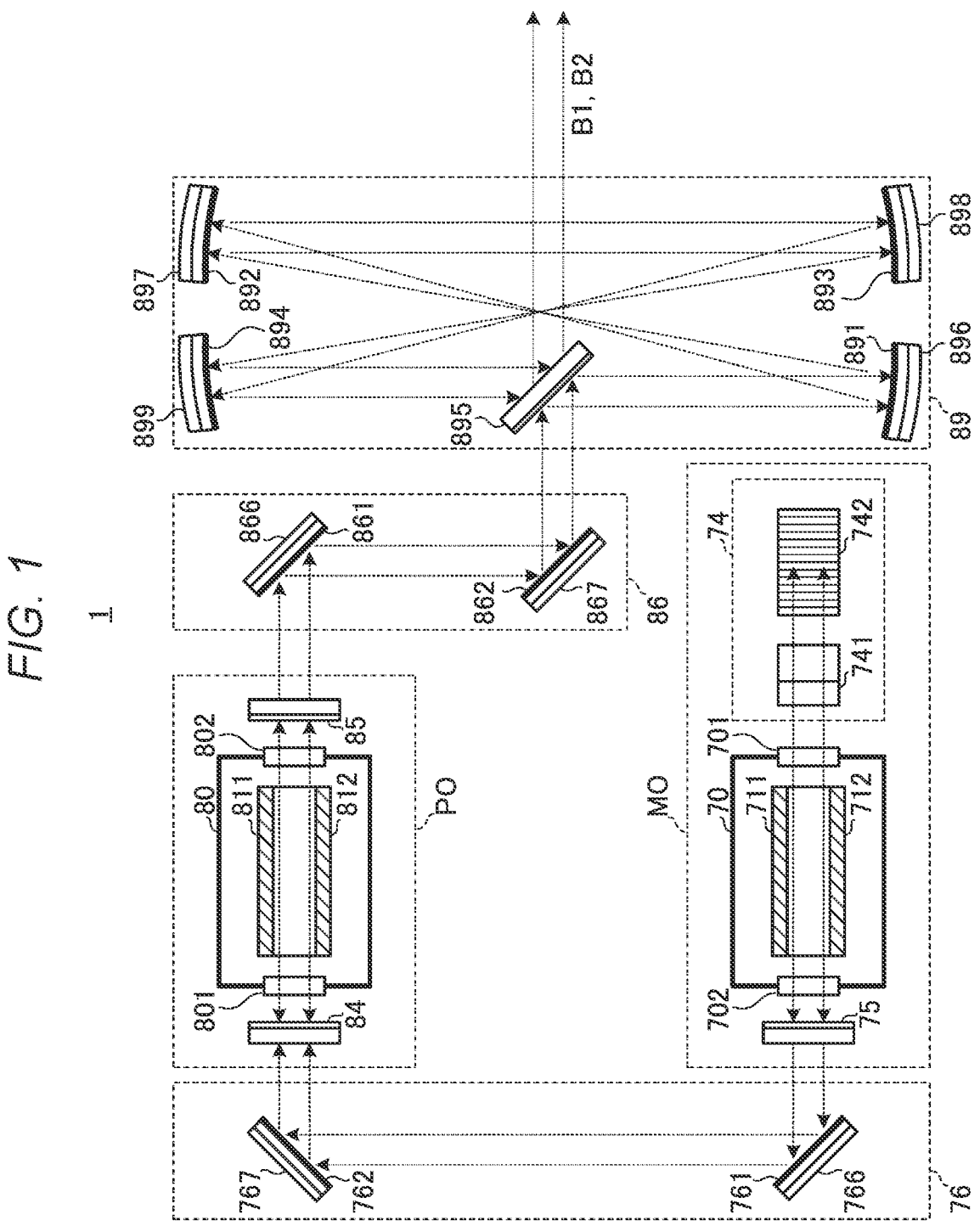
FIG. 1 diagrammatically shows the configuration of a laser apparatus according to Comparative Example.

1. Comparative Example
1.1 Configuration of laser apparatus 1
1.1.1 Master oscillator MO
1.1.2 First beam steering unit 76
1.1.3 Amplifier PO
1.1.4 Second beam steering unit 86
1.1.5 Optical pulse stretcher 89
1.2 Operation of laser apparatus 1
1.2.1 Operation of master oscillator MO
1.2.2 Operation of Amplifier PO
1.2.3 Operation of optical pulse stretcher 89
1.3 Configuration of alignment adjusters
1.3.1 First holder 11
1.3.2 Second holder 22
1.3.3 Third holder 33
1.3.4 First adjuster 41 and second adjuster 52
1.4 Operation of alignment adjusters
1.4.1 Rotation of first holder 11
1.4.2 Rotation of second holder 22
1.5 Effects
1.6 Problems with Comparative Example
1.6.1 Relationship between first expandable/contractable section 411 and second holder 22
1.6.2 Relationship between second expandable/contractable section 522 and third holder 33
1.6.3 Studies of solution
2. Alignment adjuster including support member made of same material as material of which expandable/contractable section is made
2.1 Configuration and operation
2.1.1 Second holder 22a and first support member 21a
2.1.2 Third holder 33a and second support member 32a
2.2 Other configuration examples
2.3 Effects
3. Alignment adjuster in which second plane P2 is perpendicular to first plane P1
3.1 Configuration and operation
3.1.1 Second holder 22b and first support member 21b
3.1.2 Third holder 33b and second support member 32b
3.2 Other configuration examples
3.3 Effects
4. Others Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Comparative Example 1.1 Configuration of Laser Apparatus 1

FIG. 1 diagrammatically shows the configuration of a laser apparatus 1 according to Comparative Example. The laser apparatus 1 according to Comparative Example includes a master oscillator MO, a first beam steering unit 76, an amplifier PO, a second beam steering unit 86, and an optical pulse stretcher 89.

1.1.1 Master Oscillator MO

The master oscillator MO includes a laser chamber 70, a line narrowing module 74, and an output coupling mirror 75.

The laser chamber 70 is disposed in the optical path of a laser resonator formed by the line narrowing module 74 and the output coupling mirror 75. The laser chamber 70 is provided with two windows 701 and 702. The laser chamber 70 houses discharge electrodes 711 and 712. The discharge electrodes 711 and 712 are connected to a pulse power supply that is not shown. The laser chamber 70 further houses a laser gas as a laser medium. The laser gas contains, for example, an argon gas, a fluorine gas, and a neon gas. The laser gas instead contains, for example, a krypton gas, a fluorine gas, and a neon gas.

The line narrowing module 74 includes a wavelength selector, such as a prism 741 and a grating 742. The output coupling mirror 75 is formed of a partially reflective mirror.

1.1.2 First Beam Steering Unit 76

The first beam steering unit 76 includes highly reflective mirrors 761 and 762. The highly reflective mirrors 761 and 762 are supported by alignment adjusters 766 and 767, respectively.

1.1.3 Amplifier PO

The amplifier PO includes a laser chamber 80, a rear mirror 84, and an output coupling mirror 85. The laser chamber 80, the output coupling mirror 85, windows 801 and 802 associated with the laser chamber 80, and discharge electrodes 811 and 812 are the same as the corresponding components in the master oscillator MO.

The rear mirror 84 is disposed in the optical path of the pulse laser light having passed through the first beam steering unit 76. The rear mirror 84 is formed of a partially reflective mirror. The rear mirror 84 and the output coupling mirror 85 form a laser resonator.

1.1.4 Second Beam Steering Unit 86

The second beam steering unit 86 includes highly reflective mirrors 861 and 862. The highly reflective mirrors 861 and 862 are supported by alignment adjusters 866 and 867, respectively.

1.1.5 Optical Pulse Stretcher 89

The optical pulse stretcher 89 is disposed in the optical path of the pulse laser light having passed through the second beam steering unit 86. The optical pulse stretcher 89 includes a beam splitter 895 and first to fourth concave mirrors 891 to 894. The first to fourth concave mirrors 891 to 894 are supported by alignment adjusters 896 to 899, respectively.

1.2 Operation of Laser Apparatus 1

1.2.1 Operation of Master Oscillator MO

In the master oscillator MO, the pulse power supply that is not shown generates a pulse-shaped high voltage, which is applied between the discharge electrodes 711 and 712.

When the high voltage is applied between the discharge electrodes 711 and 712, discharge occurs between the discharge electrodes 711 and 712. The energy of the discharge excites the laser gas in the laser chamber 70, and the excited laser gas transitions to a high energy level. Thereafter, when the excited laser gas transitions to a low energy level, the laser gas emits light having a wavelength according to the difference between the energy levels.

The light generated in the laser chamber 70 exits out of the laser chamber 70 via the windows 701 and 702. The light having exited via the window 701 is enlarged in terms of beam width by the prism 741 and is then incident on the grating 742. The light incident from the prism 741 on the grating 742 is reflected off and diffracted by a plurality of grooves of the grating 742 in the direction according to the wavelength of the light. The grating 742 is disposed in the Littrow arrangement, which causes the angle of incidence of the light incident from the prism 741 on the grating 742 to be equal to the angle of diffraction of the diffracted light having a desired wavelength. Light having wavelengths close to the desired wavelength thus returns into the laser chamber 70 via the prism 741.

The output coupling mirror 75 transmits and outputs a portion of the light having exited via the window 702 and reflects the remaining light back into the laser chamber 70.

The light outputted from the laser chamber 70 thus travels back and forth between the line narrowing module 74 and the output coupling mirror 75. The light is amplified whenever passing through the discharge space between the discharge electrodes 711 and 712. The light undergoes the line narrowing operation whenever deflected back by the line narrowing module 74. The light thus having undergone the laser oscillation and the line narrowing operation is outputted as the pulse laser light via the output coupling mirror 75.

1.2.2 Operation of Amplifier PO

The pulse laser light outputted via the output coupling mirror 75 enters the laser chamber 80 via the first beam steering unit 76 and the rear mirror 84.

In sync with the entry of the pulse laser light into the laser chamber 80, a pulse power supply that is not shown generates a pulse-shaped high voltage, and the high voltage is applied between the discharge electrodes 811 and 812 in the amplifier PO.

When the high voltage is applied between the discharge electrodes 811 and 812, discharge occurs between the discharge electrodes 811 and 812. The energy of the discharge amplifies the pulse laser light having entered the laser chamber 80.

The light amplified in the laser chamber 80 travels back and forth between the rear mirror 84 and the output coupling mirror 85. The light is amplified whenever passing through the discharge space between the discharge electrodes 811 and 812. The thus amplified light is outputted as the pulse laser light via the output coupling mirror 85.

1.2.3 Operation of Optical Pulse Stretcher 89

The pulse laser light outputted via the output coupling mirror 85 passes through the second beam steering unit 86 and is incident rightward in FIG. 1 on the beam splitter 895 of the optical pulse stretcher 89. The beam splitter 895 transmits a portion of the pulse laser light incident rightward in FIG. 1, which exits as pulse laser light B1, and reflects the other portion downward in FIG. 1. The reflected pulse laser light is sequentially reflected off the first to fourth concave mirrors 891 to 894 and is incident downward in FIG. 1 on the beam splitter 895.

The pulse laser light incident from the second beam steering unit 86 is brought into focus at the beam splitter 895 by the first to fourth concave mirrors 891 to 894, with the beam cross-section of the pulse laser light at the beam splitter 895 having the same size at the magnification ratio of 1:1. The beam splitter 895 reflects a portion of the pulse laser light incident downward in FIG. 1 from the fourth concave mirror 894 rightward in FIG. 1, which exits as pulse laser light B2. The pulse laser light B1 and the pulse laser light B2 are nearly coaxial with each other.

Between the pulse laser light B1 and the pulse laser light B2, there is a time difference according to the optical path length of a delay optical path formed of the first to fourth concave mirrors 891 to 894. The pulse laser light B1 and the pulse laser light B2 are spatially superimposed on each other, so that pulse laser light having a stretched pulse width can be outputted.

1.3 Configuration of Alignment Adjusters

Figure 2A:
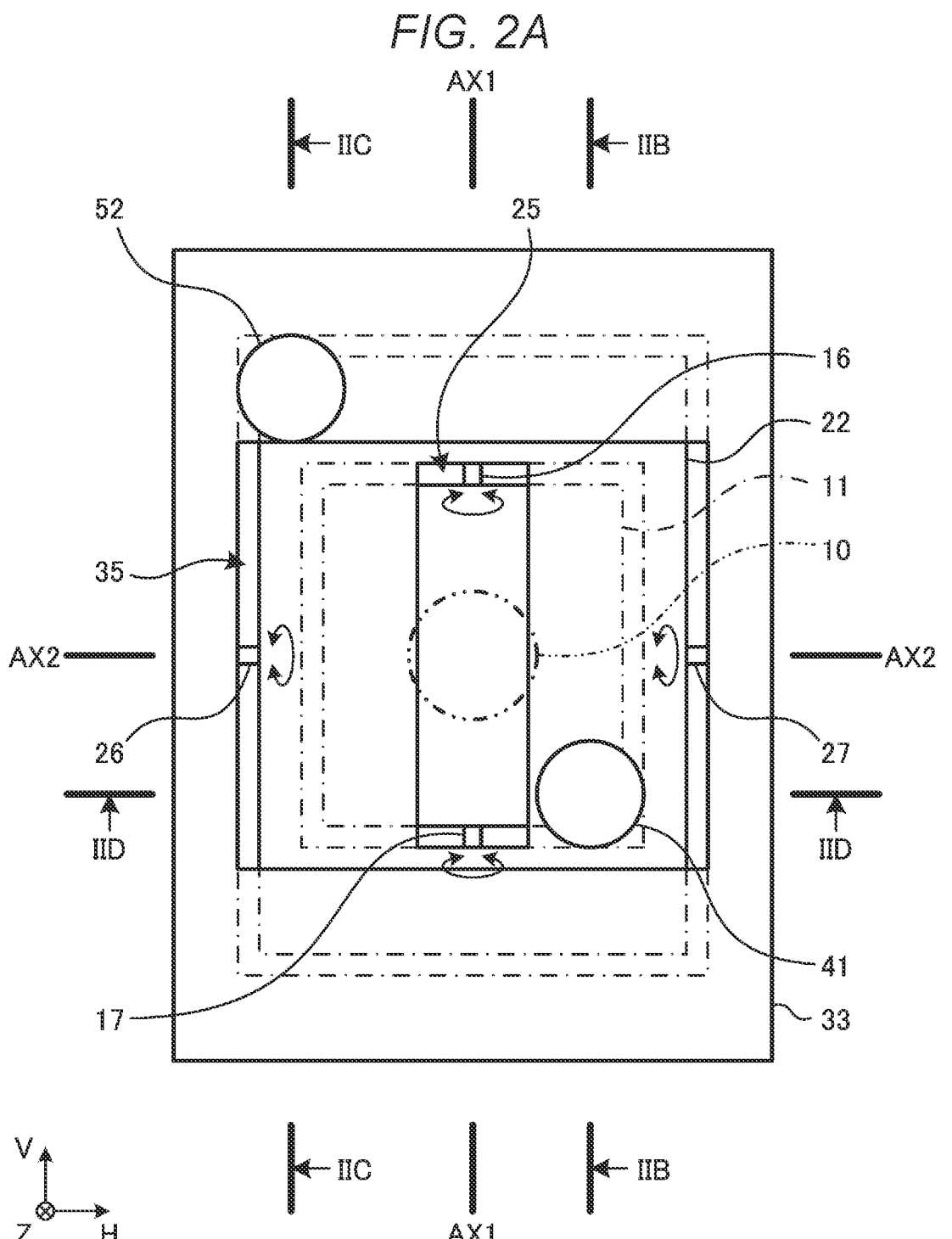
FIG. 2A diagrammatically shows an alignment adjuster according to Comparative Example.

FIG. 2A diagrammatically shows an alignment adjuster according to Comparative Example. It is assumed in FIG. 2A that an axis H is the horizontal axis, an axis V is the vertical axis, and an axis Z is the axis perpendicular to the plane of view. The axes H, V, and Z are perpendicular to one another.

Figure 2B:
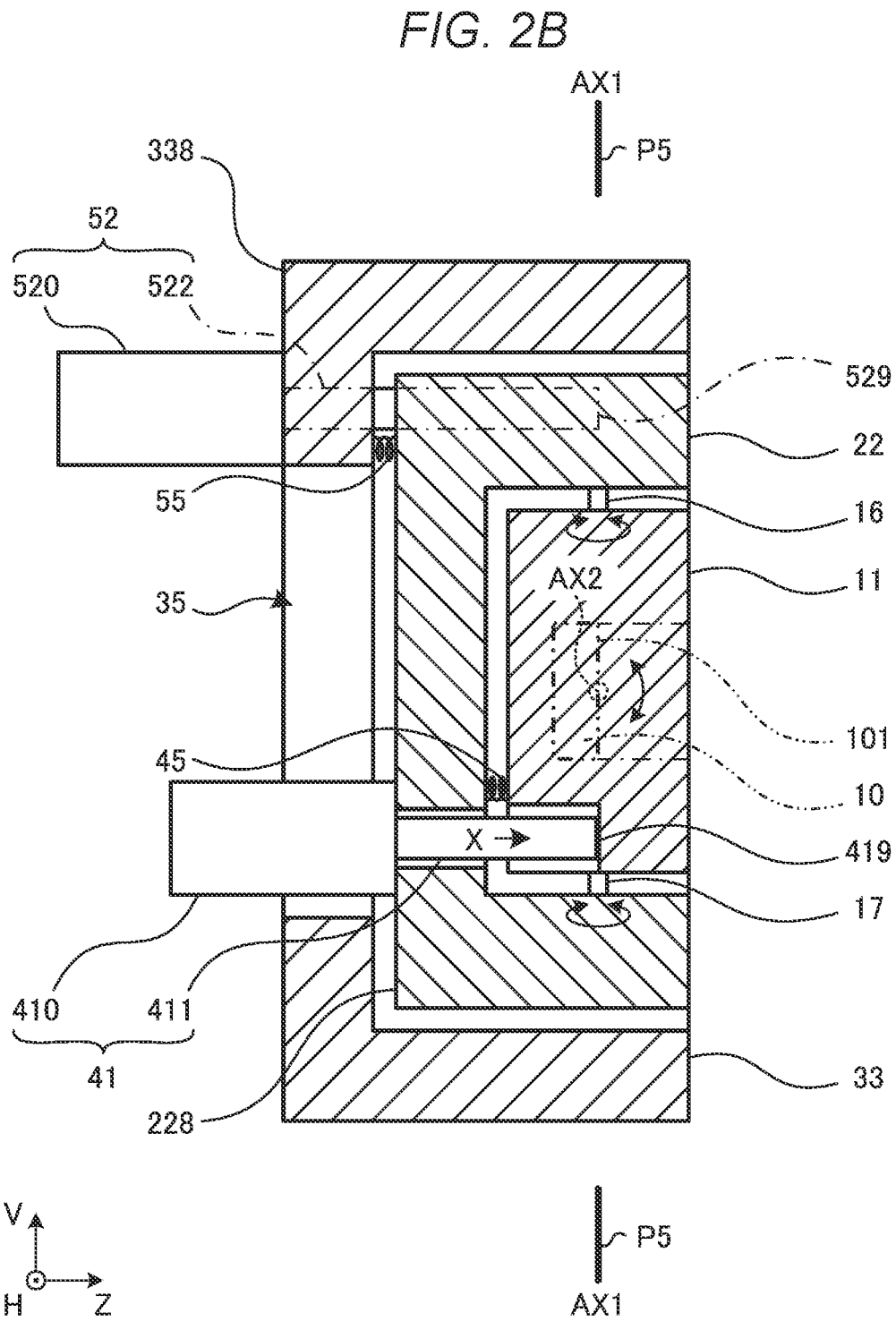
FIG. 2B is a cross-sectional view taken along the line IIB-IIB in FIG. 2A.
Figure 2C:
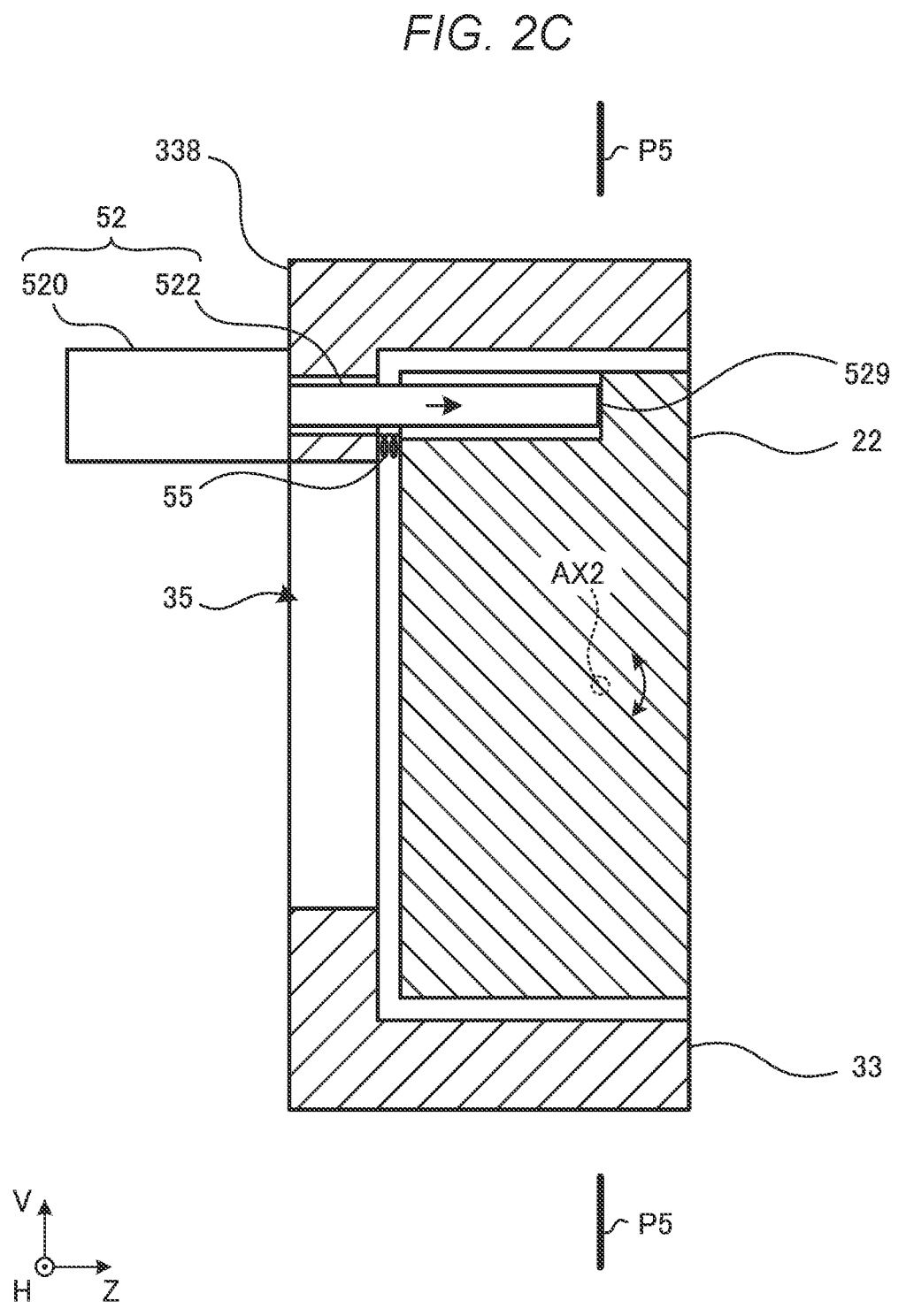
Figure 2D:
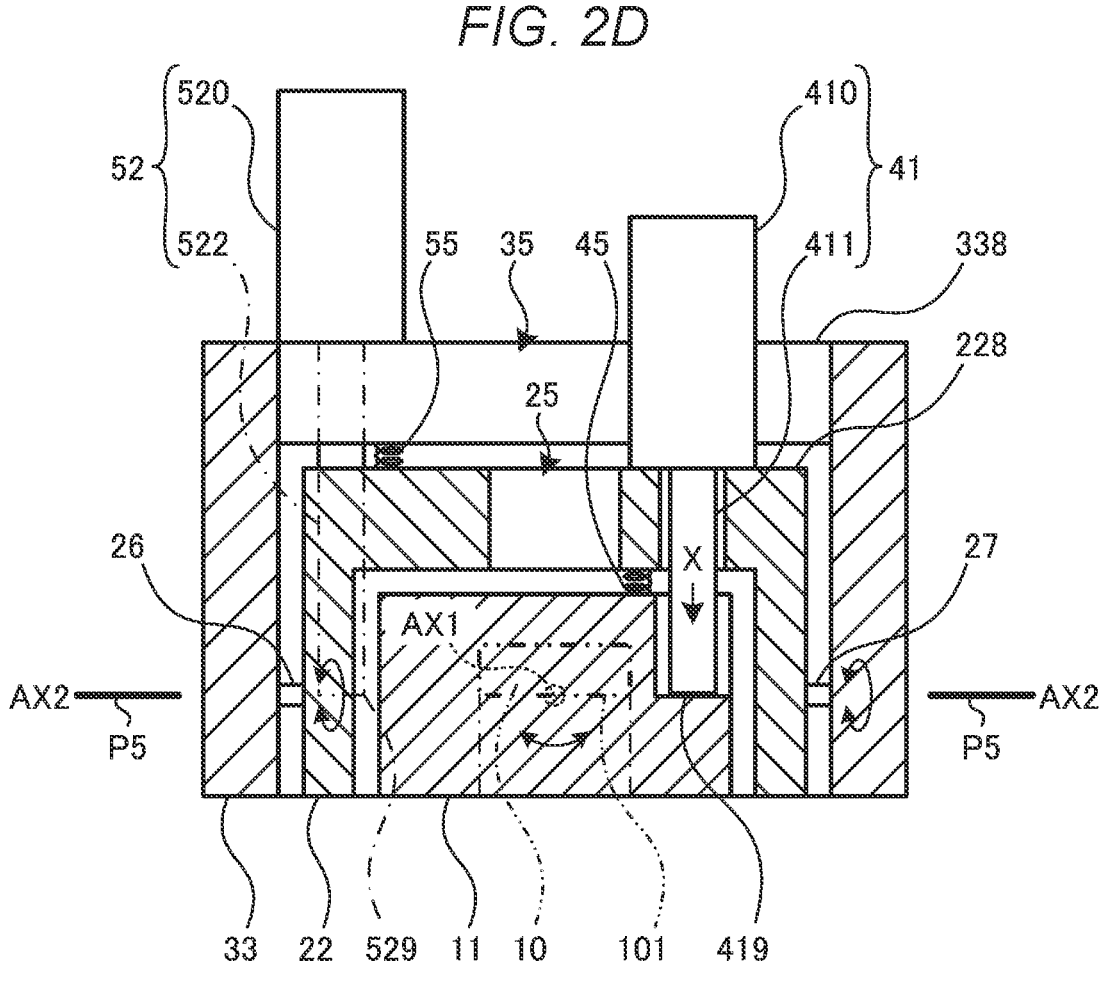
FIG. 2D is a cross-sectional view taken along the line IID-IID in FIG. 2A.

FIG. 2B is a cross-sectional view taken along the line IIB-IIB in FIG. 2A, FIG. 2C is a cross-sectional view taken along the line IIC-IIC in FIG. 2A, and FIG. 2D is a cross-sectional view taken along the line IID-IID in FIG. 2A.

The alignment adjusters are each an apparatus that supports an optical element and adjusts the posture of the optical element. In the following description, a mirror 10 is used as an example of the optical element. Examples of the mirror 10 may include the highly reflective mirrors 761, 762, 861, and 862 and the first to fourth concave mirrors 891 to 894, which have been described with reference to FIG. 1.

The alignment adjusters each include a first holder 11, a second holder 22, a third holder 33, a first adjuster 41, and a second adjuster 52.

1.3.1 First Holder 11

The first holder 11 supports the mirror 10 in such a way that the first holder 11 surrounds and is in contact with the mirror 10. Note that the first holder 11 is configured not to cover a reflective surface 101 of the mirror 10, which is the surface facing the +Z side.

1.3.2 Second Holder 22

The second holder 22 supports the first holder 11 in such a way that the second holder 22 surrounds the first holder 11 and is separate therefrom. The second holder 22 supports the first holder 11 via pins 16 and 17, and the first holder 11 is rotatable around a first axis AX1 defined by the pins 16 and 17. The first axis AX1 is a straight line that connects the centers of the pins 16 and 17 to each other.

The second holder 22 is configured not to cover the reflective surface 101 of the mirror 10. The second holder 22 has an opening 25. The reason why the second holder 22 has the opening 25 is as follows: Most of the light incident on the reflective surface 101 of the mirror 10 is reflected off the mirror 10, whereas a portion of the light passes through the mirror 10. When the light having passed through the mirror 10 is incident on the second holder 22, the temperature of the second holder 22 rises and the second holder 22 hence thermally expands, resulting in an unintentional change in the posture of the mirror 10 in some cases. The thermal expansion of the second holder 22 can be suppressed by providing the opening 25 to allow the light having passed through the mirror 10 to pass through the opening 25. Furthermore, heat of the mirror 10 can be dissipated through the opening 25 toward the rear side of the mirror 10, which is the side opposite from the reflective surface 101. The first holder 11 may also be provided with an opening that is not shown but has a diameter smaller than that of the mirror 10 and is located at the rear side of the mirror 10, as the second holder 22 is provided with the opening 25.

1.3.3 Third Holder 33

The third holder 33 supports the second holder 22 in such a way that the third holder 33 surrounds the second holder 22 and is separate therefrom. The third holder 33 supports the second holder 22 via pins 26 and 27, and the second holder 22 is rotatable around a second axis AX2 defined by the pins 26 and 27. The second axis AX2 is a straight line that connects the centers of the pins 26 and 27 to each other, and the second axis AX2 is parallel to the axis H. The first axis AX1 and the second axis AX2 are perpendicular to each other at approximately the center position of the reflective surface 101 of the mirror 10. In the following description, the plane containing the first axis AX1 and the second axis AX2 is referred to as a fifth plane P5.

The third holder 33 is configured not to cover the reflective surface 101 of the mirror 10. The third holder 33 has an opening 35. The reason why the third holder 33 has the opening 35 is the same as the reason described with reference to the opening 25. The first holder 11, the second holder 22, and the third holder 33 are made, for example, of aluminum. Aluminum corresponds to the first material in the present disclosure.

1.3.4 First Adjuster 41 and Second Adjuster 52

The first adjuster 41 is supported by the second holder 22. The first adjuster 41 includes a drive section 410 and a first expandable/contractable section 411. The drive section 410 is fixed to a surface 228 of the second holder 22, which is the surface facing the −Z side. The first expandable/contractable section 411 is a rod-shaped member and passes through the second holder 22. An end section 419 of the first expandable/contractable section 411 is located outside the drive section 410, and the opposite end, which is not shown, of the first expandable/contractable section 411 is housed in the drive section 410. The drive section 410 moves part of the first expandable/contractable section 411 inward and outward, so that a portion of the first expandable/contractable section 411, the portion located outside the drive section 410, expands or contracts. In the following description, the state in which a portion of the first expandable/contractable section 411, the portion located outside the drive section 410, expands or contracts is referred to as "the first expandable/contractable section 411 expands or contracts" in some cases. The term expandable/contractable includes expansion and contraction. The X direction in which the first expandable/contractable section 411 expands is perpendicular to the fifth plane P5.

The end section 419 of the first expandable/contractable section 411 is in contact with the first holder 11 at a position shifted toward the +H side from the first axis AX1.

A spring 45 is disposed between the first holder 11 and the second holder 22 in the vicinity of the first expandable/contractable section 411 with the spring 45 stretched. Instead, a spring that is not shown may be disposed between the first holder 11 and the second holder 22 at a position shifted toward the −H side from the first axis AX1 with the spring compressed. Still instead, a spring that is not shown may be disposed at a surface of the first holder 11, the surface facing the +Z side.

The second adjuster 52 is supported by the third holder 33. The second adjuster 52 includes a drive section 520 and a second expandable/contractable section 522. The drive section 520 is fixed to a surface 338 of the third holder 33, which is the surface facing the −Z side. The second expandable/contractable section 522 is a rod-shaped member and passes through the third holder 33. An end section 529 of the second expandable/contractable section 522 is located outside the drive section 520, and the opposite end, which is not shown, of the second expandable/contractable section 522 is housed in the drive section 520. The drive section 520 moves part of the second expandable/contractable section 522 inward and outward, so that a portion of the second expandable/contractable section 522, the portion located outside the drive section 520, expands or contracts. In the following description, the state in which a portion of the second expandable/contractable section 522, the portion located outside the drive section 520, expands or contracts is referred to as "the second expandable/contractable section 522 expands or contracts" in some cases. The direction in which the second expandable/contractable section 522 expands is the +Z direction.

The end section 529 of the second expandable/contractable section 522 is in contact with the second holder 22 at a position shifted toward the +V side from the second axis AX2. The end section 529 of the second expandable/contractable section 522 is located in the fifth plane P5.

A spring 55 is disposed between the second holder 22 and the third holder 33 in the vicinity of the second expandable/contractable section 522 with the spring 55 stretched. Instead, a spring that is not shown may be disposed between the second holder 22 and the third holder 33 at a position shifted toward the −V side from the second axis AX2 with the spring compressed. Still instead, a spring that is not shown may be disposed at a surface of the second holder 22, the surface facing the +Z side.

The first adjuster 41 and the second adjuster 52 are each formed, for example, of a micrometer.

The first expandable/contractable section 411 and the second expandable/contractable section 522 are made, for example, of stainless steel (SUS). Stainless steel corresponds to the second material in the present disclosure. The second material, such as stainless steel, has a coefficient of thermal expansion smaller than that of the first material, such as aluminum. The first material, such as aluminum, has a specific gravity smaller than that of the second material, such as stainless steel.

1.4 Operation of Alignment Adjusters

Figure 2E:
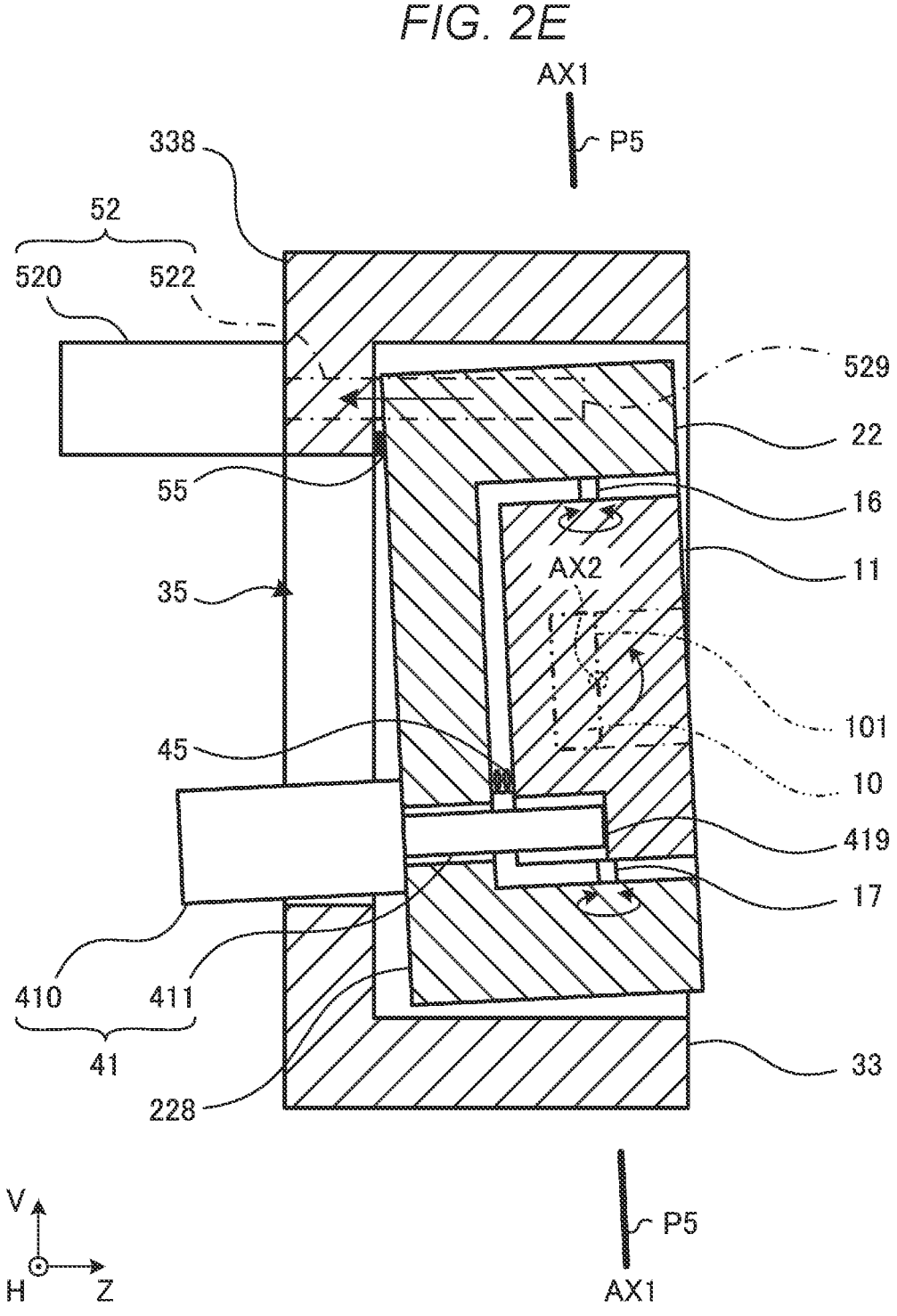
FIG. 2E is a cross-sectional view of the portion corresponding to FIG. 2B with a second holder rotated in Comparative Example.
Figure 2F:
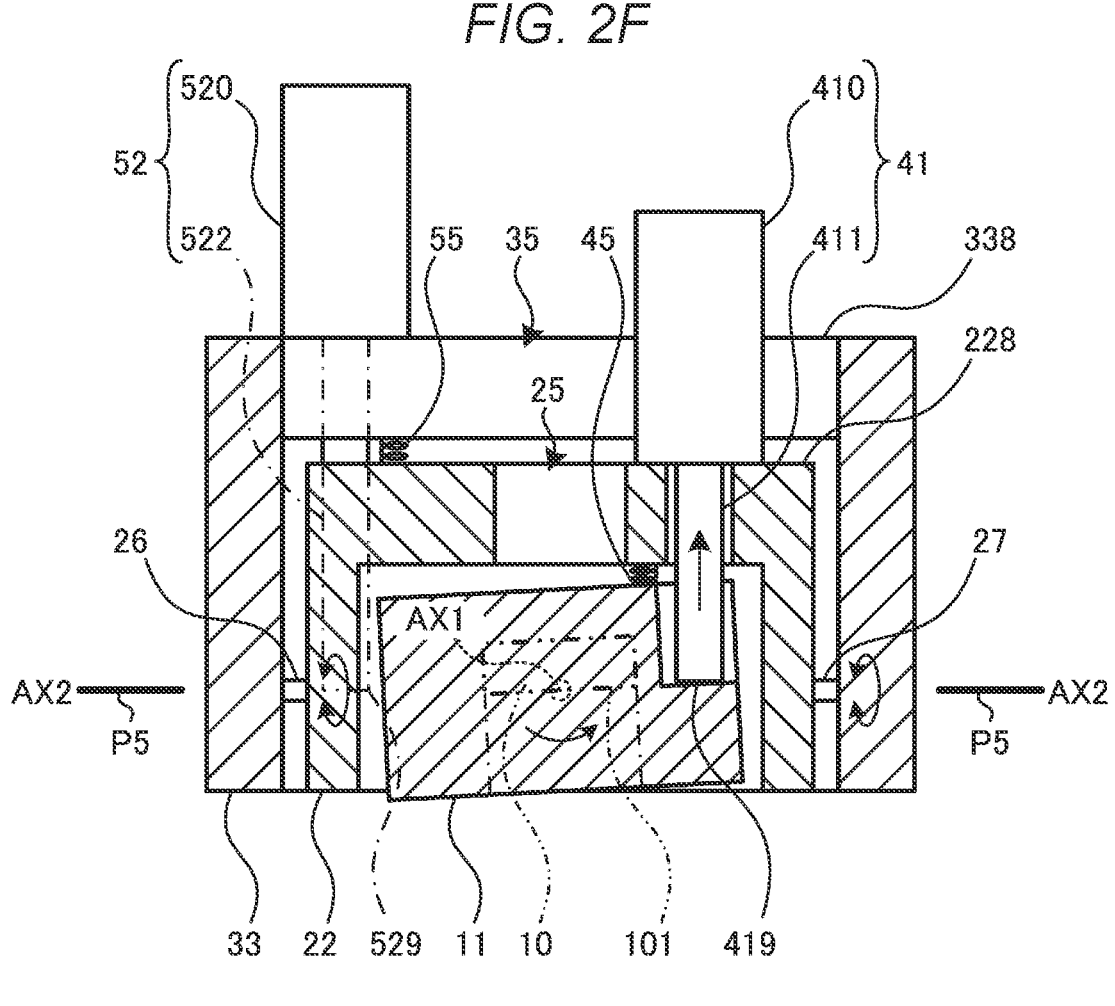
FIG. 2F is a cross-sectional view of the portion corresponding to FIG. 2D with a first holder rotated in Comparative Example.

FIG. 2E is a cross-sectional view of the portion corresponding to FIG. 2B with the second holder 22 rotated in Comparative Example. FIG. 2F is a cross-sectional view of the portion corresponding to FIG. 2D with the first holder 11 rotated in Comparative Example.

1.4.1 Rotation of First Holder 11

When the drive section 410 causes the first expandable/contractable section 411 to expand, part of the first holder 11 is pushed by the first expandable/contractable section 411, so that the first holder 11 rotates around the first axis AX1 relative to the second holder 22.

When the drive section 410 causes the first expandable/contractable section 411 to contract, part of the first holder 11 is pulled by the spring 45, so that the first holder 11 rotates around the first axis AX1 relative to the second holder 22 (see FIG. 2F). The first holder 11 rotates in opposite directions when the first expandable/contractable section 411 expands and contracts.

Adjusting the length of the first expandable/contractable section 411 with the first expandable/contractable section 411 being in contact with the first holder 11 as described above causes the first holder 11 and the mirror 10 to rotate around the first axis AX1.

The state in which the end section 419 of the first expandable/contractable section 411 is located in the fifth plane P5, as shown in FIG. 2D, is referred in some cases to as an "unadjusted state" in the following description.

The state in which the expansion or contraction of the first expandable/contractable section 411 causes the end section 419 of the first expandable/contractable section 411 to be located at a position outside the fifth plane P5, as shown in FIG. 2F, is referred in some cases to as an "adjusted state" in the following description.

1.4.2 Rotation of Second Holder 22

When the drive section 520 causes the second expandable/contractable section 522 to expand, part of the second holder 22 is pushed by the second expandable/contractable section 522, so that the second holder 22 rotates around the second axis AX2 relative to the third holder 33.

When the drive section 520 causes the second expandable/contractable section 522 to contract, part of the second holder 22 is pulled by the spring 55, so that the second holder 22 rotates around the second axis AX2 relative to the third holder 33 (see FIG. 2E). The second holder 22 rotates in opposite directions when the second expandable/contractable section 522 expands and contracts. When the second holder 22 rotates around the second axis AX2, the first axis AX1 also rotates around the second axis AX2, and the fifth plane P5 tilts.

Adjusting the length of the second expandable/contractable section 522 with the second expandable/contractable section 522 being in contact with the second holder 22 as described above causes the second holder 22, the first adjuster 41, the first holder 11, and the mirror 10 to rotate around the second axis AX2.

The state in which the fifth plane P5 is perpendicular to the +Z direction, in which the second expandable/contractable section 522 expands, as shown in FIG. 2C, is referred in some cases to as the "unadjusted state" in the following description. The first axis AX1 is parallel to the axis V when the second expandable/contractable section 522 is in the unadjusted state.

The state in which the expansion or contraction of the second expandable/contractable section 522 causes the fifth plane P5 to tilt with respect to the +Z direction, in which the second expandable/contractable section 522 expands, as shown in FIG. 2E, is referred in some cases to as the "adjusted state" in the following description.

1.5 Effects

As described above, the first holder 11 can rotate around the first axis AX1 relative to the second holder 22, and the second holder 22 can rotate around the second axis AX2 relative to the third holder 33. The mirror 10 can thus be rotated around the two axes perpendicular to each other to adjust the posture thereof, and the angles of rotation around the axes can be adjusted independently of each other.

The first expandable/contractable section 411 and the second expandable/contractable section 522 may be configured not only to be in contact with the first holder 11 and the second holder 22, respectively, but to be hooked to the first holder 11 and the second holder 22, respectively. In this case, when the first expandable/contractable section 411 and the second expandable/contractable section 522 contract, the first holder 11 and the second holder 22 may be pulled thereby and rotate, so that none of the springs 45 and 55 may be provided.

1.6 Problems with Comparative Example 1.6.1 Relationship Between First Expandable/Contractable Section 411 and Second Holder 22.

As described above, the drive section 410 of the first adjuster 41 is fixed to the second holder 22, and the position where the end section 419 of the first expandable/contractable section 411 is in contact with the first holder 11 in the unadjusted state coincides with the fifth plane P5.

When the second holder 22 and the first expandable/contractable section 411 differ from each other in terms of the coefficient of thermal expansion, the following problem arises: The distance in the Z direction from the surface 228 of the second holder 22, which is the surface facing the −Z side and to which the drive section 410 is fixed, to the fifth plane P5 depends on the coefficient of thermal expansion and the temperature of the second holder 22. The distance from surface 228 to the end section 419 of the first expandable/contractable section 411 in the Z direction depends on the coefficient of thermal expansion and the temperature of the first expandable/contractable section 411. When the temperature of the alignment adjuster including the second holder 22 and the first expandable/contractable section 411 changes due to the energy of the pulse laser light, the positional relationship between the fifth plane P5 and the end section 419 of the first expandable/contractable section 411 undesirably changes independently of the adjustment made by the drive section 410. The posture of the mirror 10 therefore undesirably changes.

Furthermore, when a difference in thermal conductivity, a difference in specific heat, or a difference in any other factor between the second holder 22 and the first expandable/contractable section 411 causes a difference in temperature between the second holder 22 and the first expandable/contractable section 411, the positional relationship between the fifth plane P5 and the end section 419 of the first expandable/contractable section 411 also undesirably changes.

1.6.2 Relationship Between Second Expandable/Contractable Section 522 and Third Holder 33

As described above, the drive section 520 of the second adjuster 52 is fixed to the third holder 33, and the end section 529 of the second expandable/contractable section 522 is in contact with the second holder 22 in the fifth plane P5. The fifth plane P5 in the unadjusted state is perpendicular to the +Z direction, in which the second expandable/contractable section 522 expands.

When the third holder 33 and the second expandable/contractable section 522 differ from each other in terms of the coefficient of thermal expansion, the same problem described above arises. That is, when the temperature of the alignment adjuster changes due to the energy of the pulse laser light, the tilt of the fifth plane P5 with respect to the +Z direction, in which the second expandable/contractable section 522 expands, changes independently of the adjustment made by the drive section 520. The posture of the mirror 10 therefore undesirably changes.

Furthermore, when a difference in thermal conductivity, a difference in specific heat, or a difference in any other factor between the third holder 33 and the second expandable/contractable section 522 causes a difference in temperature between the third holder 33 and the second expandable/contractable section 522, the tilt of the fifth plane P5 with respect to the +Z direction, in which the second expandable/contractable section 522 expands, undesirably changes.

1.6.3 Studies of Solution

When the second holder 22 and the third holder 33 are made of the same second material as the material of which the first expandable/contractable section 411 and the second expandable/contractable section 522 are made, the members described above have the same coefficient of thermal expansion, thermal conductivity, and specific heat, whereby the problem described above is reduced. However, when the second material has large specific gravity, the second holder 22 and other members become heavy, which can make high-speed posture control difficult.

In some embodiments described below, a first support member 21a or 21b, which supports the first adjuster 41, is disposed at a second holder 22a or 22b, and the first support member 21a or 21b and the first expandable/contractable section 411 are made of the same material. Furthermore, a second support member 32a or 32b, which supports the second adjuster 52, is disposed at a third holder 33a or 33b, and the second support member 32a or 32b and the second expandable/contractable section 522 are made of the same material.

Figure 3A:
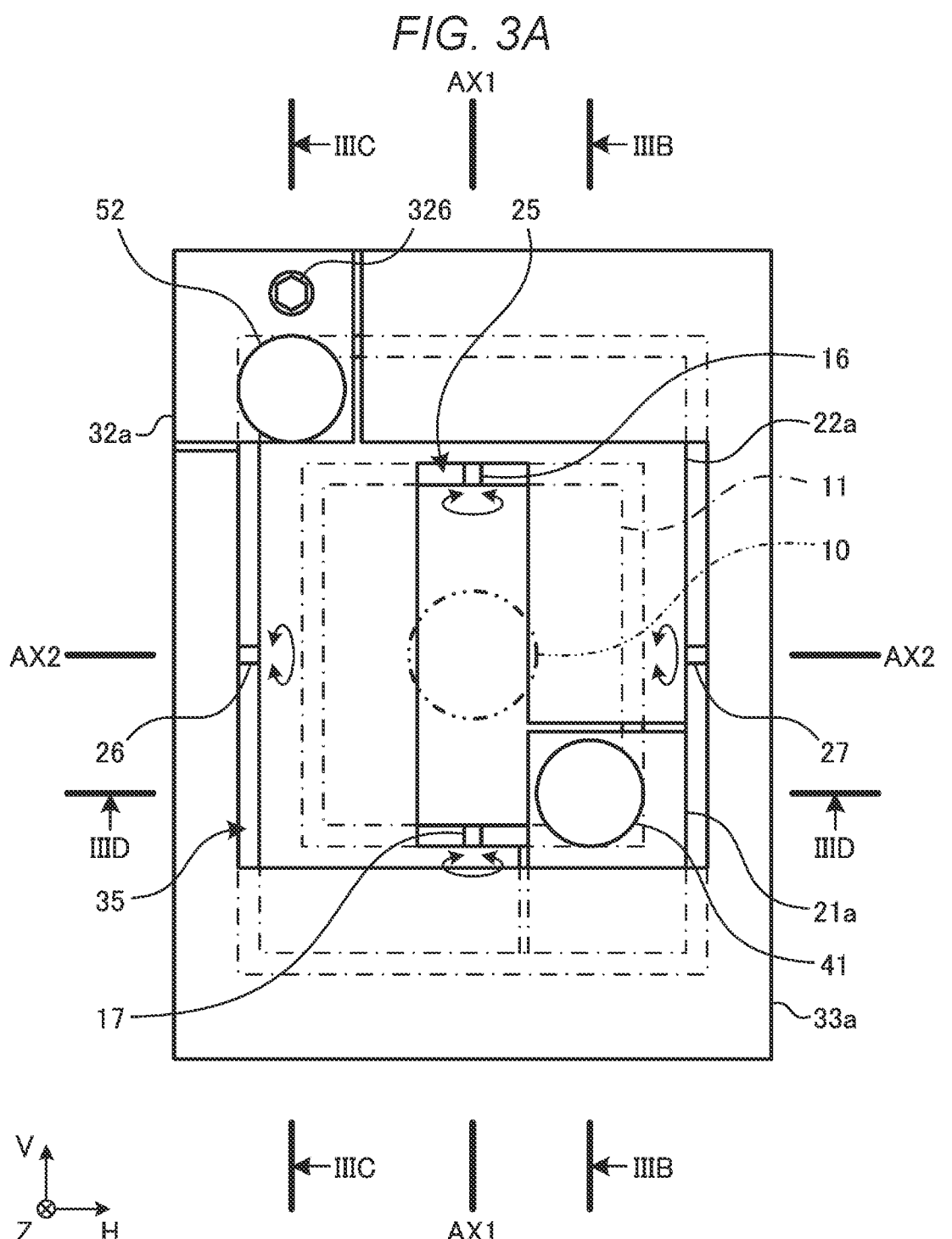
FIG. 3A diagrammatically shows an alignment adjuster according to a first embodiment.
Figure 3B:
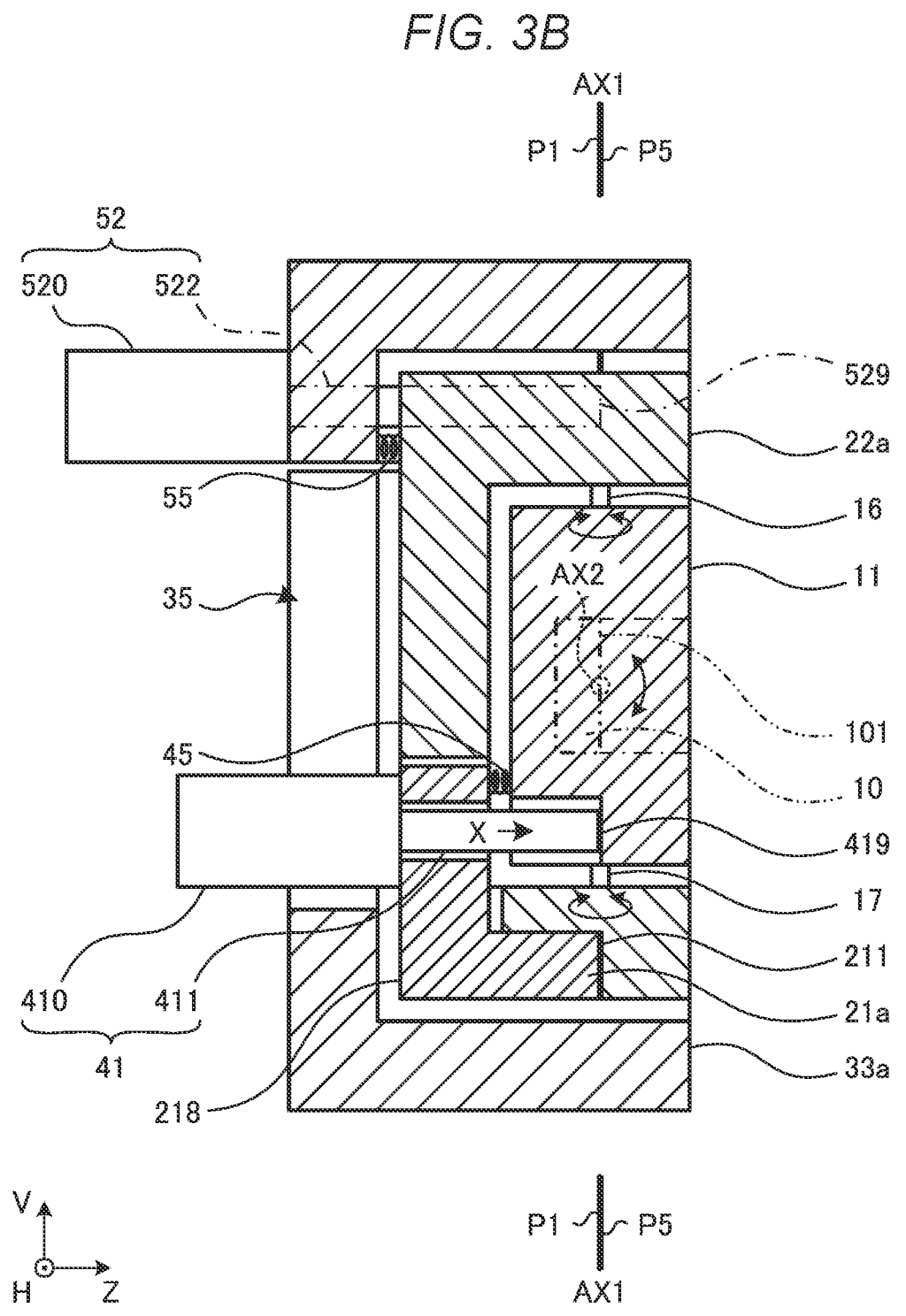
Figure 3C:
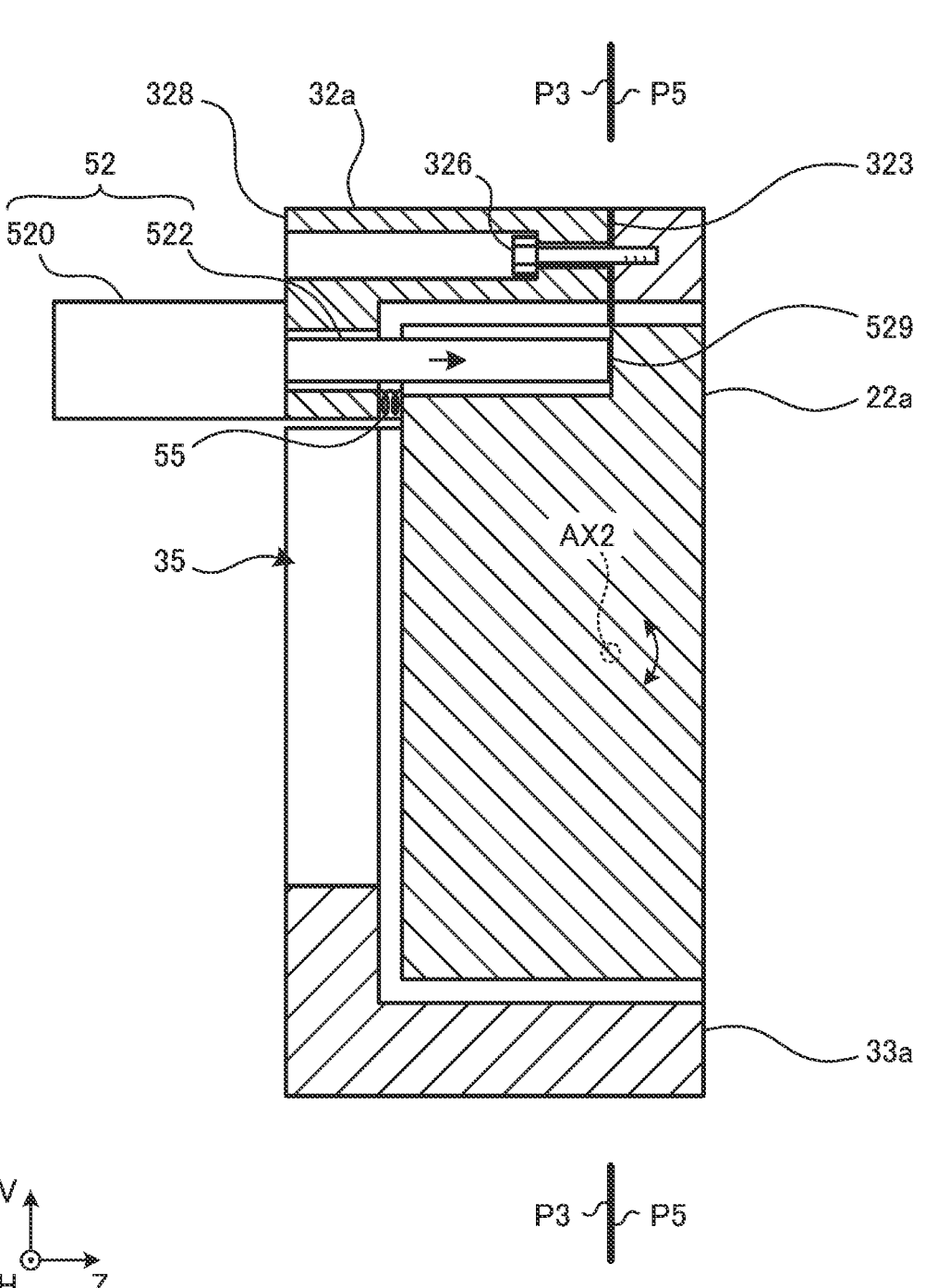
FIG. 3C is a cross-sectional view taken along the line IIIC-IIIC in FIG. 3A.
Figure 3D:
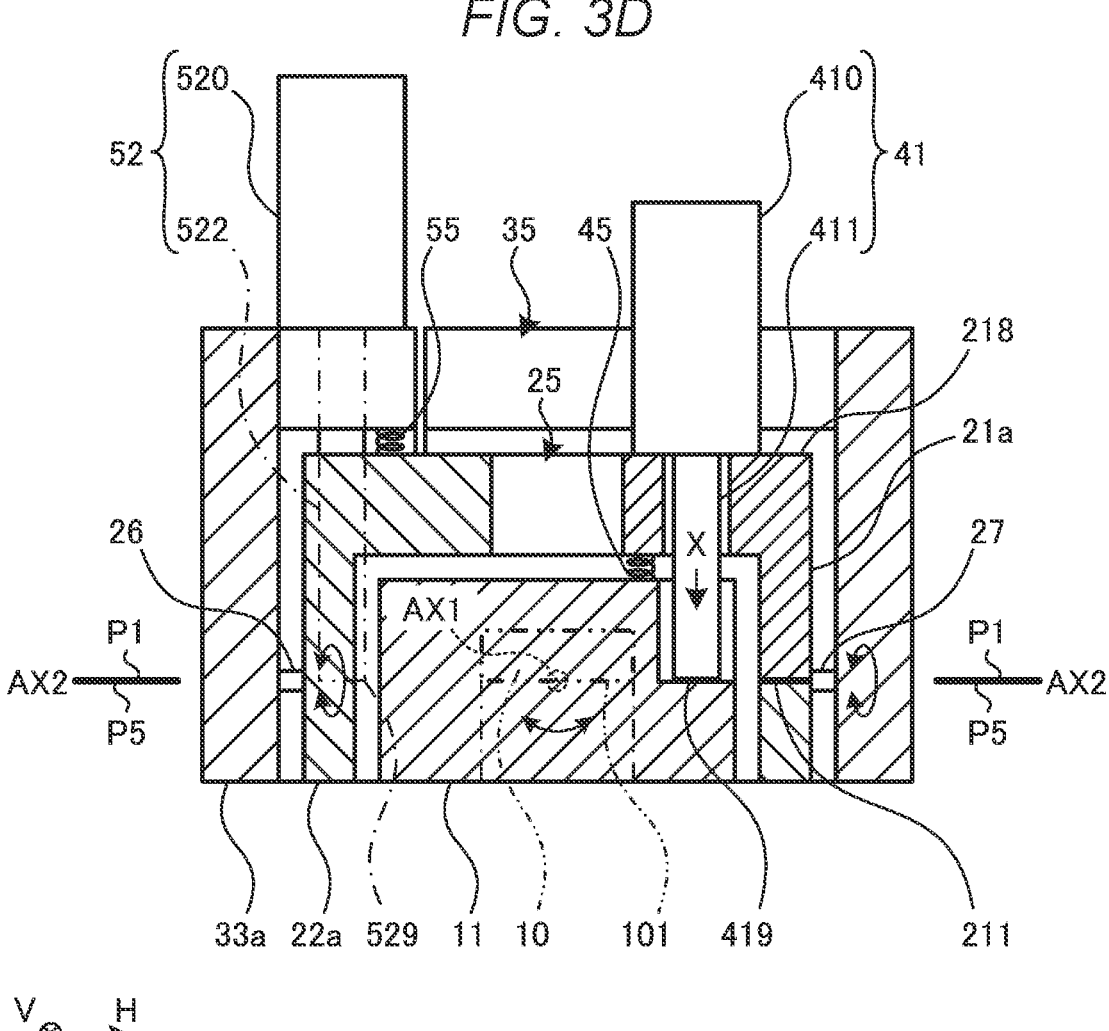
FIG. 3D is a cross-sectional view taken along the line IIID-IIID in FIG. 3A.

2. Alignment Adjuster Including Support Member Made of Same Material as Material of which Expandable/Contractable Section is Made 2.1 Configuration and Operation FIG. 3A diagrammatically shows an alignment adjuster according to a first embodiment. FIG. 3B is a cross-sectional view taken along the line IIIB-IIIB in FIG. 3A, FIG. 3C is a cross-sectional view taken along the line IIIC-IIIC in FIG. 3A, and FIG. 3D is a cross-sectional view taken along the line IIID-IIID in FIG. 3A.

2.1.1 Second Holder 22a and First Support Member 21a

The alignment adjuster according to the first embodiment includes the second holder 22a and the first support member 21a in place of the second holder 22 in Comparative Example. The shape of the combination of the second holder 22a and the first support member 21a substantially corresponds to the shape of the second holder 22 in Comparative Example.

The second holder 22a supports the first holder 11 at the first axis AX1 and further supports the first support member 21a at a first end section 211 of the first support member 21a, the end section facing the +Z side. The second holder 22a is made of the first material, for example, aluminum. The first support member 21a is fixed to the second holder 22a with a bolt that is not shown but passes through the first end section 211.

The first support member 21a supports the first adjuster 41. The drive section 410 provided in the first adjuster 41 is fixed to a surface 218 of the first support member 21a, the surface facing the −Z side.

The first end section 211 of the first support member 21a is located in the fifth plane P5. A first plane P1 containing the first end section 211 and the first axis AX1 therefore coincides with the fifth plane P5. The first plane P1 is perpendicular to the X direction, in which the first expandable/contractable section 411 expands.

The end section 419 of the first expandable/contractable section 411 in the unadjusted state is not only located in the fifth plane P5 but also in the first plane P1. The distance in the Z direction from the surface 218 of the first support member 21a, the surface to which the drive section 410 is fixed and which faces the −Z side, to the end section 419 of the first expandable/contractable section 411 in the unadjusted state is approximately equal to the distance in the Z direction from the surface 218 to the first end section 211 of the first support member 21a.

The first support member 21a is made of the second material, stainless steel, for example, of which the first expandable/contractable section 411 is made. Therefore, even when the temperatures of the first support member 21a and the first expandable/contractable section 411 change, the first support member 21a and the first expandable/contractable section 411 change in length in the Z direction by approximately the same amount. The positional relationship between the end section 419 of the first expandable/contractable section 411 in the unadjusted state and the fifth plane P5 can therefore be stable.

The above description has been made with reference to the case where the end section 419, where the first expandable/contractable section 411 is in contact with the first holder 11, coincides with the first plane P1 in the unadjusted state, but not necessarily in the present disclosure. The position of the end section 419, where the first expandable/contractable section 411 is in contact with the first holder 11, only needs to be adjustable in such a way that the end section 419 is located in the first plane P1. The term "adjustable" means that part of the first plane P1 falls within the range over which the position of the end section 419, where the first expandable/contractable section 411 is in contact with the first holder 11, is movable.

2.1.2 Third Holder 33a and Second Support Member 32a

The alignment adjuster according to the first embodiment includes a third holder 33a and a second support member 32a in place of the third holder 33 in Comparative Example. The shape of the combination of the third holder 33a and the second support member 32a substantially corresponds to the shape of the third holder 33 in Comparative Example.

The third holder 33a supports the second holder 22a at the second axis AX2 and further supports the second support member 32a at a third end section 323 (see FIG. 3C) of the second support member 32a, the end section facing the +Z side. The third holder 33a is made of the first material, for example, aluminum. The second support member 32a is fixed to the third holder 33a with a bolt 326 passing through the third end section 323.

The second support member 32a supports the second adjuster 52. The drive section 520 provided in the second adjuster 52 is fixed to a surface 328 of the second support member 32a, the surface facing the −Z side. A third plane P3, which contains the third end section 323 of the second support member 32a and the second axis AX2, is perpendicular to the +Z direction, in which the second expandable/contractable section 522 expands.

The third end section 323 is located in the fifth plane P5 in the unadjusted state. That is, the third plane P3 coincides with the fifth plane P5 in the unadjusted state.

The end section 529 of the second expandable/contractable section 522 is located in the fifth plane P5, as described above. That is, the second expandable/contractable section 522 is in contact with the second holder 22a in the fifth plane P5.

In the unadjusted state, the position, where the end section 529 of the second expandable/contractable section 522 is in contact with the second holder 22a, coincides with the third plane P3. The distance in the Z direction from the surface 328 of the second support member 32a, to which the drive section 520 is fixed and which faces the –Z side, to the end section 529 of the second expandable/contractable section 522 in the unadjusted state is approximately equal to the distance in the Z direction from the surface 328 to the third end section 323 of the second support member 32a.

The second support member 32a is made of the second material, stainless steel, for example, of which the second expandable/contractable section 522 is made. Therefore, even when the temperatures of the second expandable/contractable section 522 and the second support member 32a change, the second expandable/contractable section 522 and the second support member 32a change in length in the Z direction by approximately the same amount. The tilt of the fifth plane P5 with respect to the +Z direction, in which the second expandable/contractable section 522 expands, can therefore be stabilized.

The above description has been made with reference to the case where the end section 529, where the second expandable/contractable section 522 is in contact with the second holder 22a, coincides with the third plane P3 in the unadjusted state, but not necessarily in the present disclosure. The position of the end section 529, where the second expandable/contractable section 522 is in contact with the second holder 22a, only needs to be adjustable in such a way that the end section 529 is located in the third plane P3. The term "adjustable" means that part of the third plane P3 falls within the range over which the position of the end section 529, where the second expandable/contractable section 522 is in contact with the second holder 22a, is movable.

2.2 Other Configuration Examples

In the first embodiment, the posture of the mirror 10 is adjusted around two axes perpendicular to each other, but not necessarily in the present disclosure. The axis of rotation may be the first axis AX1 alone, and none of the third holder 33a, the second support member 32a, and the second adjuster 52 may be provided.

2.3 Effects

According to the first embodiment, the alignment adjuster includes the first holder 11, the first adjuster 41, the first support member 21a. The first holder 11 is made of the first material, such as aluminum, and supports the mirror 10. The first adjuster 41 includes the first expandable/contractable section 411 made of the second material, such as stainless steel, which differs from the first material. The first adjuster 41 adjusts the length of the first expandable/contractable section 411 with the first expandable/contractable section 411 being in contact with the first holder 11 to rotate the first holder 11 and the mirror 10 around the first axis AX1. The first support member 21a is made of the second material and supports the first adjuster 41.

The first adjuster 41 is capable of adjusting the position where the first expandable/contractable section 411 and the first holder 11 are in contact with each other to be located in the first plane P1 containing the first end section 211 of the first support member 21a and the first axis AX1.

The adjustment can therefore be so made that the distance in the Z direction from the surface 218 of the first support member 21a, the surface facing the –Z side, to the first end section 211 is equal to the distance in the Z direction from the surface 218 to the end section 419, where the first expandable/contractable section 411 is in contact with the first holder 11. Since the first support member 21a and the first expandable/contractable section 411 are both made of the second material and therefore have the same coefficient of thermal expansion, the first support member 21a and the first expandable/contractable section 411 change in length in the Z direction by approximately the same amount even when the temperatures of the first support member 21a and the first expandable/contractable section 411 change. The situation in which the positional relationship between the end section 419 of the first expandable/contractable section 411 and the fifth plane P5 changes independently of the adjustment made by the drive section 410 is therefore suppressed. Furthermore, since the first support member 21a and the first expandable/contractable section 411 have the same thermal conductivity and specific heat, a difference in temperature between the first support member 21a and the first expandable/contractable section 411 is suppressed. A change in the positional relationship between the end section 419 of the first expandable/contractable section 411 and the fifth plane P5 is therefore suppressed.

According to the first embodiment, the alignment adjuster further includes the second holder 22a, made of the first material, which supports the first holder 11 at the first axis AX1 and further supports the first support member 21a at the first end section 211.

Thus, supporting the first holder 11 at the first axis AX1 and supporting the first support member 21a, which supports the first adjuster 41, at the first end section 211 are performed commonly by the second holder 22a. The posture of the mirror 10 can therefore be more stabilized.

According to the first embodiment, the second material has a coefficient of thermal expansion smaller than that of the first material.

The first expandable/contractable section 411 and the first support member 21a are thus made of a material having a small coefficient of thermal expansion, whereby the posture of the first holder 11 can be more stabilized.

According to the first embodiment, the first material has a specific gravity smaller than that of the second material.

The first holder 11 or both the first holder 11 and the second holder 22a are made of a material having a small specific gravity, which may allow high-speed posture control.

According to the first embodiment, the alignment adjuster further includes the second adjuster 52 and the second support member 32a. The second adjuster 52 includes the second expandable/contractable section 522 made of the second material, and adjusts the length of the second expandable/contractable section 522 with the second expandable/contractable section 522 being in contact with the second holder 22a to rotate the second holder 22a, the first holder 11, and the mirror 10 around the second axis AX2 different from the first axis AX1. The second support member 32a is made of the second material and supports the second adjuster 52.

The posture of the mirror 10 can therefore be adjusted around the second axis AX2 in addition to the first axis AX1.

According to the first embodiment, the second adjuster 52 is capable of adjusting the position where the second expandable/contractable section 522 and the second holder 22a are in contact with each other to be located in the third plane P3 containing the third end section 323 of the second support member 32a and the second axis AX2.

The adjustment can therefore be so made that the distance in the Z direction from the surface 328 of the second support member 32a, the surface facing the −Z side, to the third end section 323 is equal to the distance in the Z direction from the surface 328 to the end section 529, where the second expandable/contractable section 522 is in contact with the second holder 22a. Since the second support member 32a and the second expandable/contractable section 522 are both made of the second material and therefore have the same coefficient of thermal expansion, the second support member 32a and the second expandable/contractable section 522 change in length in the Z direction approximately by the same amount even when the temperatures of the second support member 32a and the second expandable/contractable section 522 change. The situation in which the tilt of the fifth plane P5 with respect to the +Z direction, in which the second expandable/contractable section 522 expands, changes independently of the adjustment made by the drive section 520 is therefore suppressed. Furthermore, since the second support member 32a and the second expandable/contractable section 522 have the same thermal conductivity and specific heat, a difference in temperature between the second support member 32a and the second expandable/contractable section 522 is suppressed. A change in the tilt of the fifth plane P5 with respect to the +Z direction, in which the second expandable/contractable section 522 expands, can therefore be suppressed.

According to the first embodiment, the alignment adjuster further includes the third holder 33a, made of the first material, which supports the second holder 22a at the second axis AX2 and further supports the second support member 32a at the third end section 323.

Thus, supporting the second holder 22a at the second axis AX2 and supporting the second support member 32a, which supports the second adjuster 52, at the third end section 323 are performed commonly by the third holder 33a. The posture of the mirror 10 can therefore be more stabilized.

According to the first embodiment, the first axis AX1 and the second axis AX2 intersect with each other, and the first end section 211 of the first support member 21a is located in the fifth plane P5 containing the first axis AX1 and the second axis AX2.

According to the configuration described above, since the first support member 21a is disposed with respect to the fifth plane P5 defined by the first axis AX1 and the second axis AX2, the posture of the mirror 10 can be stabilized.

According to the first embodiment, the first plane P1 containing the first end section 211 and the first axis AX1 is perpendicular to the X direction, in which the first expandable/contractable section 411 expands.

According to the configuration described above, when the end section 419, where the first expandable/contractable section 411 is in contact with the first holder 11, is located in the first plane P1, the force that rotates the first holder 11 can be efficiently applied.

According to the first embodiment, the second expandable/contractable section 522 is in contact with the second holder 22a in the fifth plane P5.

According to the configuration described above, since the posture of the second holder 22a is adjusted with respect to the fifth plane P5 defined by the first axis AX1 and the second axis AX2, the posture of the mirror 10 can be stabilized.

According to the first embodiment, the third plane P3, which contains the third end section 323 of the second support member 32a and the second axis AX2, is perpendicular to the +Z direction, in which the second expandable/contractable section 522 expands.

According to the configuration described above, when the end section 529, where the second expandable/contractable section 522 is in contact with the second holder 22a, is located in the third plane P3, the force that rotates the second holder 22a can be efficiently applied.

As for the other points, the first embodiment is the same as Comparative Example.

3. Alignment Adjuster in which Second Plane P2 is Perpendicular to First Plane P1

3.1 Configuration and Operation

Figure 4A:
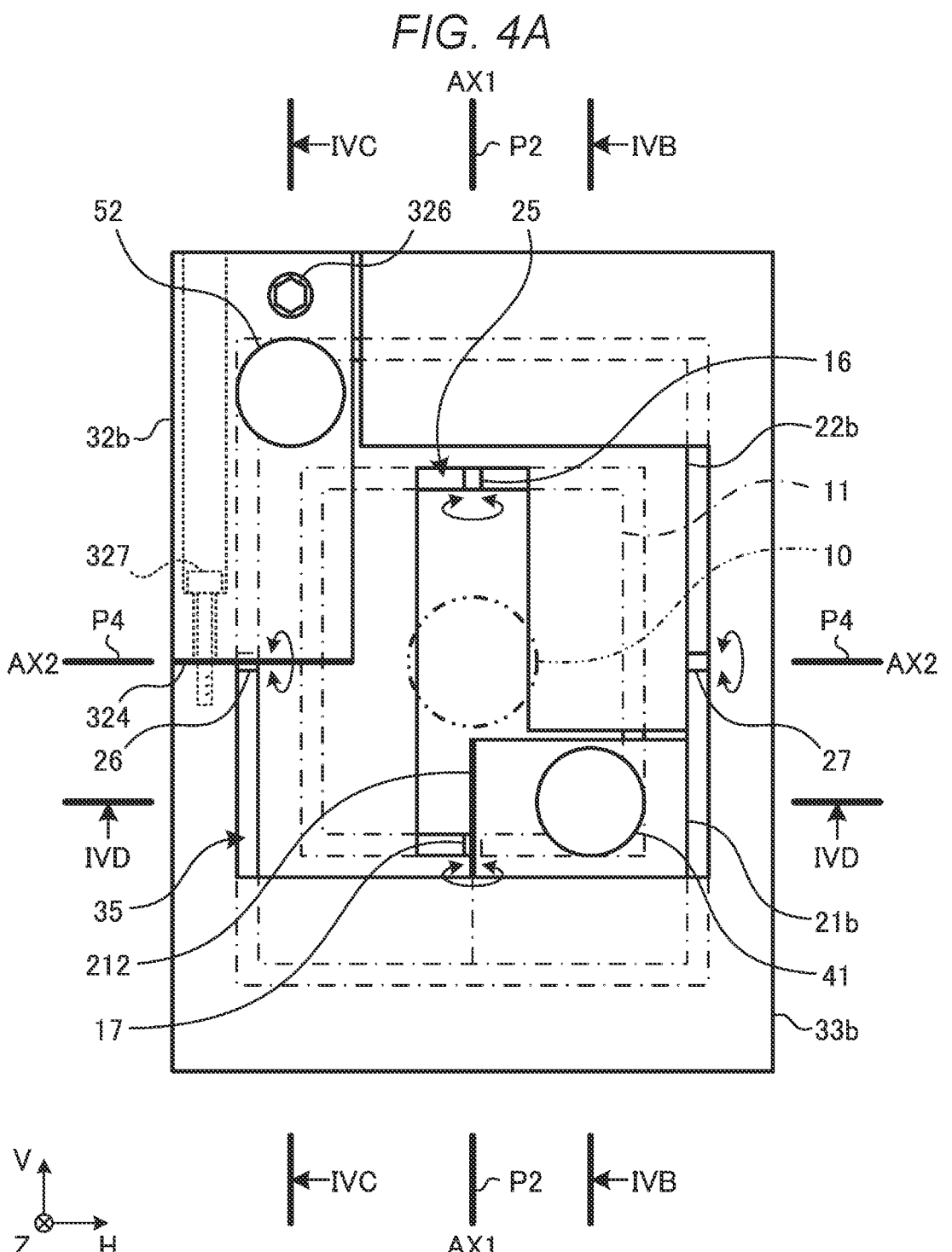
FIG. 4A diagrammatically shows an alignment adjuster according to a second embodiment.
Figure 4B:
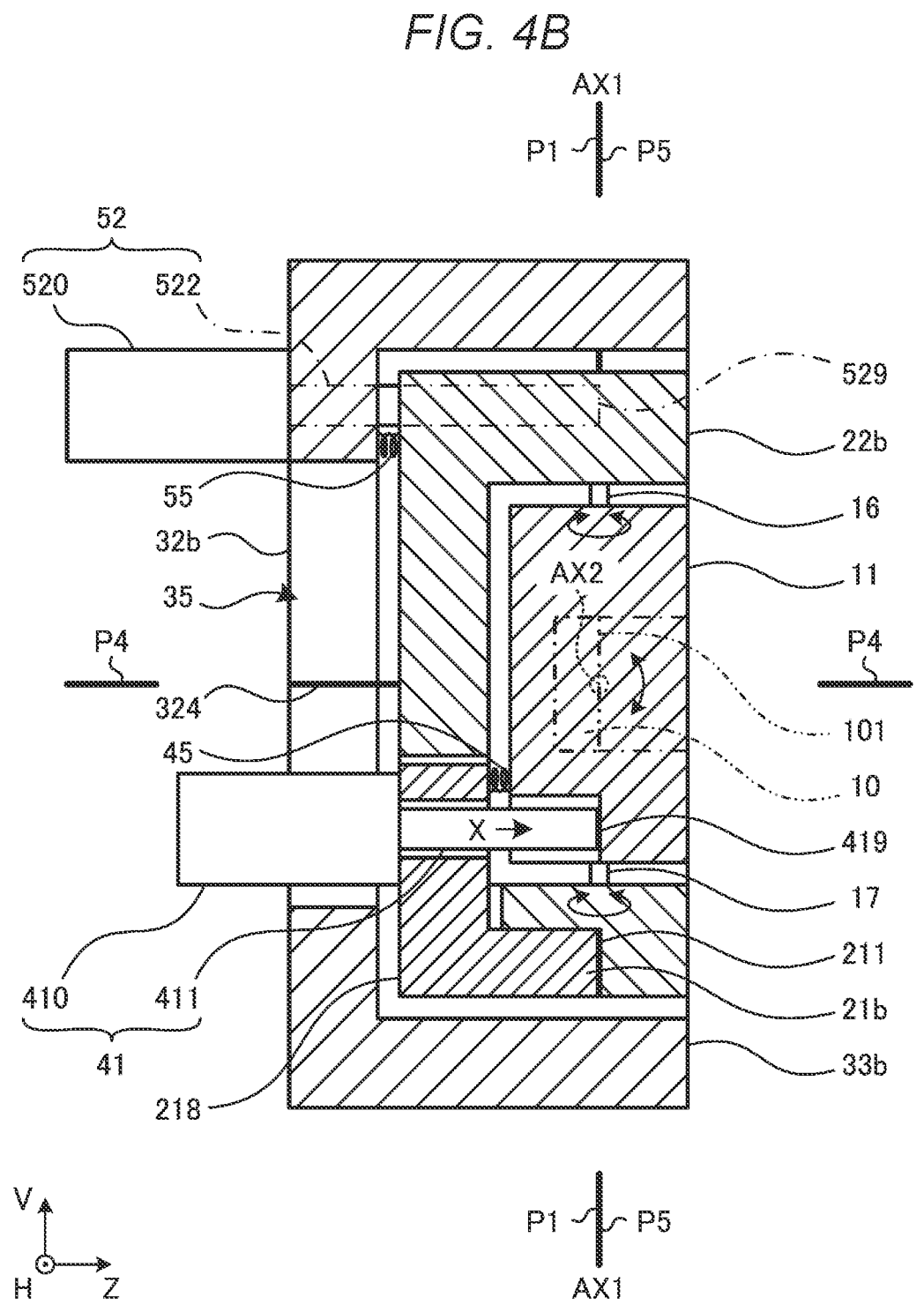
Figure 4C:
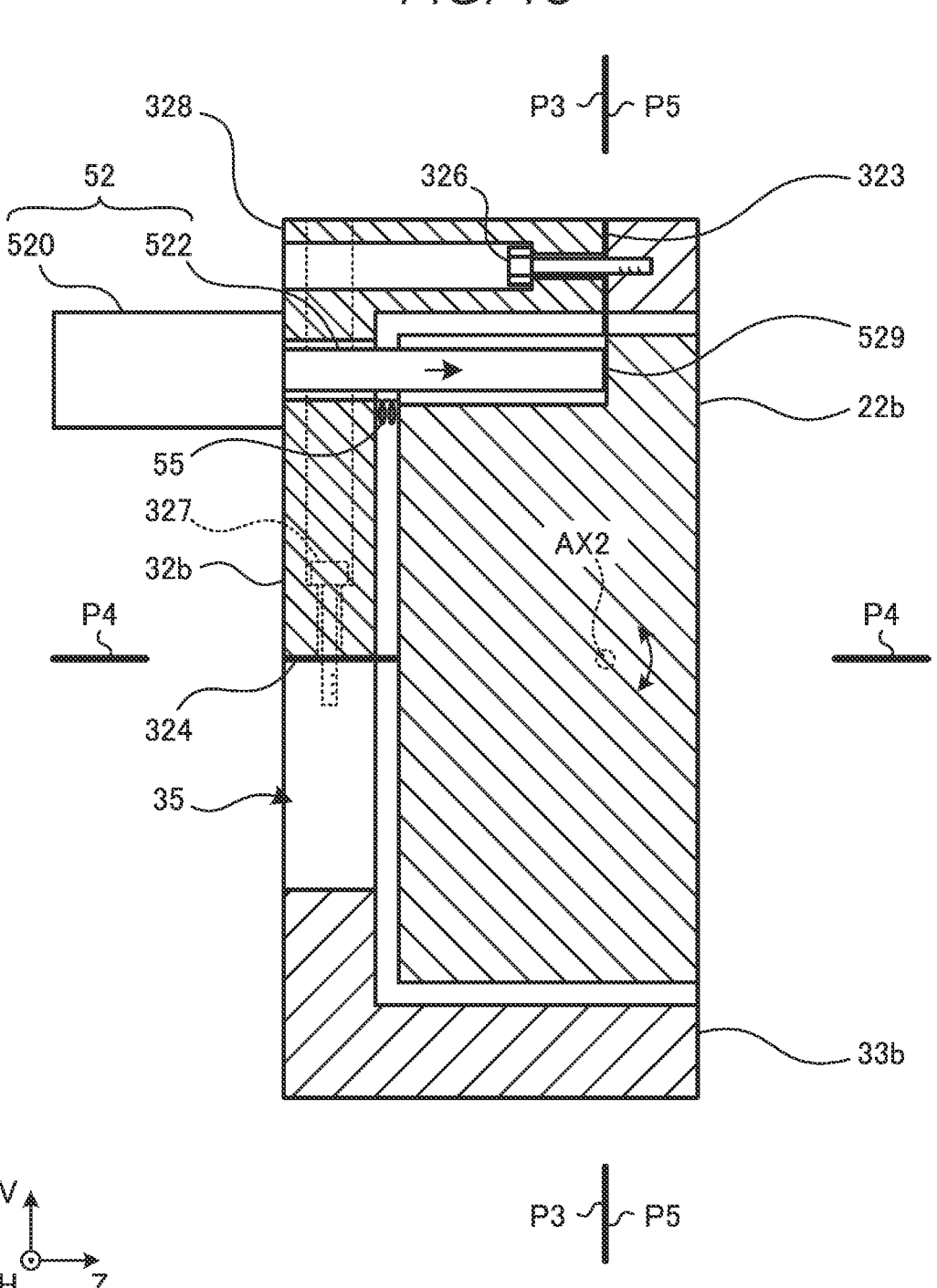
FIG. 4C is a cross-sectional view taken along the line IVC-IVC in FIG. 4A.
Figure 4D:
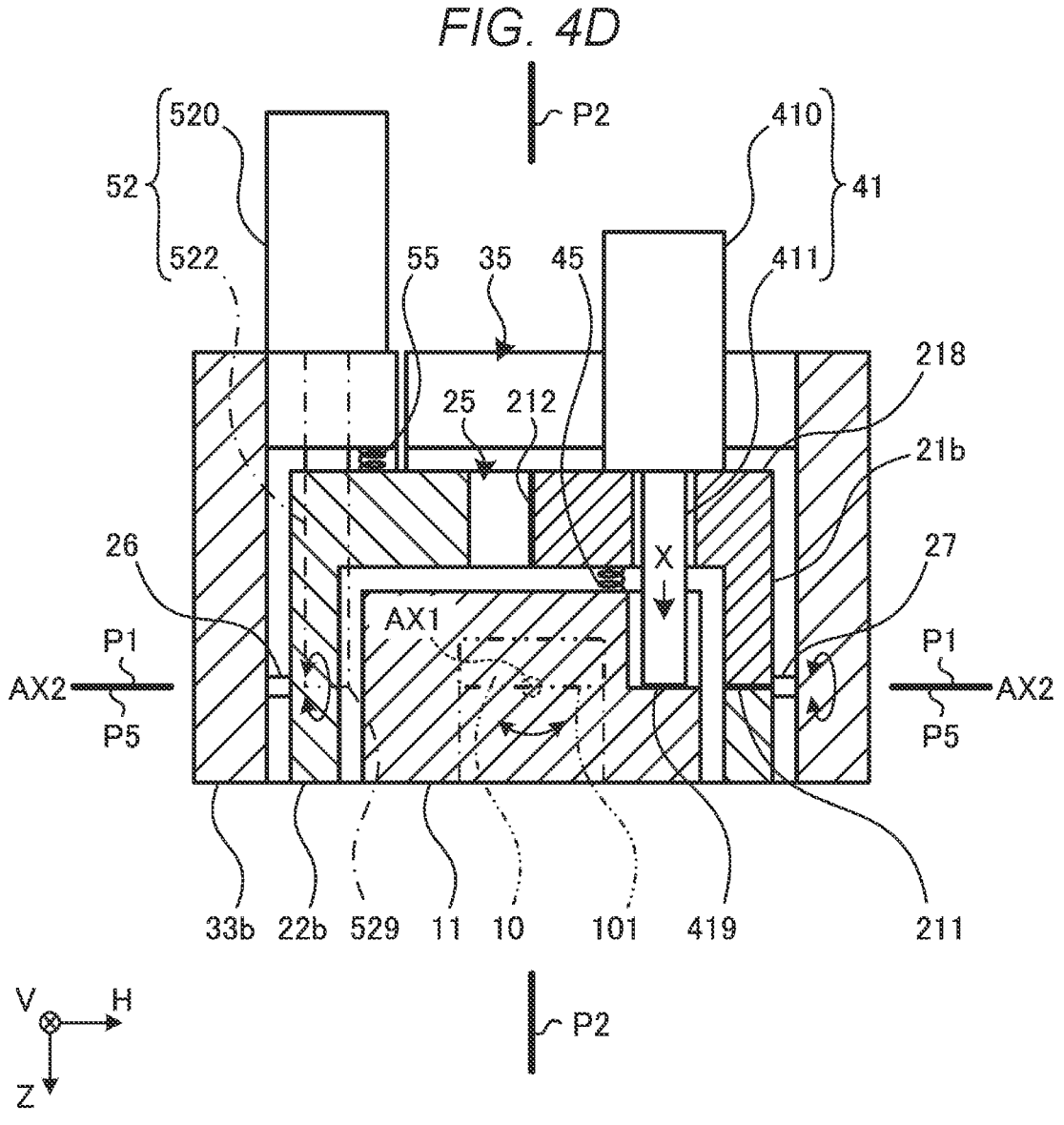
FIG. 4D is a cross-sectional view taken along the line IVD-IVD in FIG. 4A.

FIG. 4A diagrammatically shows an alignment adjuster according to a second embodiment. FIG. 4B is a cross-sectional view taken along the line IVB-IVB in FIG. 4A, FIG. 4C is a cross-sectional view taken along the line IVC-IVC in FIG. 4A, and FIG. 4D is a cross-sectional view taken along the line IVD-IVD in FIG. 4A.

3.1.1 Second Holder 22b and First Support Member 21b

The alignment adjuster according to the second embodiment includes the second holder 22b and the first support member 21b in place of the second holder 22a and the first support member 21a in the first embodiment. The shape of the combination of the second holder 22b and the first support member 21b substantially corresponds to the shape of the combination of the second holder 22a and the first support member 21a in the first embodiment.

The second holder 22b supports the first holder 11 at the first axis AX1 and further supports the first support member 21b at a first end section 211 of the first support member 21b, the end section facing the +Z side, and at a second end section 212 of the first support member 21b, the end section facing the −H side. The first support member 21b is fixed to the second holder 22b with a bolt that is not shown but passes through the first end section 211 and a bolt that is not shown but passes through the second end section 212.

A second plane P2 containing the second end section 212 and the first axis AX1 is perpendicular to the first plane P1 containing the first end section 211 of the first support member 21b and the first axis AX1. The second plane P2 is also perpendicular to the fifth plane P5 containing the first axis AX1 and the second axis AX2.

3.1.2 Third Holder 33b and Second Support Member 32b

The alignment adjuster according to the second embodiment includes the third holder 33b and the second support member 32b in place of the third holder 33a and the second support member 32a in the first embodiment. The shape of the combination of the third holder 33b and the second support member 32b substantially corresponds to the shape of the combination of the third holder 33a and the second support member 32a in the first embodiment.

The third holder 33b supports the second holder 22b at the second axis AX2 and further supports the second support member 32b at the third end section 323 of the second support member 32b, the end section facing the +Z side, and at a fourth end section 324 of the second support member 32b, the end section facing the −V side. The second support member 32b is fixed to the third holder 33b with a bolt 326 passing through the third end section 323 and a bolt 327 passing through the fourth end section 324.

A fourth plane P4 containing the fourth end section 324 and the second axis AX2 is perpendicular to the third plane P3 containing the third end section 323 of the second support member 32b and the second axis AX2.

3.2 Other Configuration Examples

In the second embodiment, the posture of the mirror 10 is adjusted around two axes perpendicular to each other, but not necessarily in the present disclosure. The axis of rotation may be the first axis AX1 alone, and none of the third holder 33*b*, the second support member 32*b*, and the second adjuster 52 may be provided.

3.3 Effects

Figure 4E:
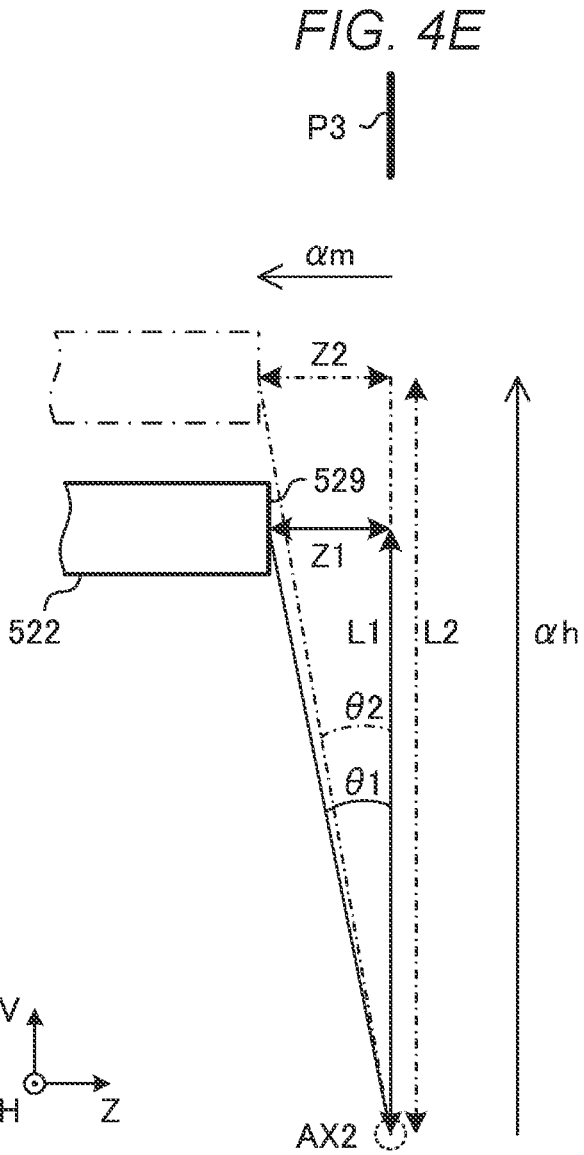
FIG. 4E shows the positional relationship between a second expandable/contractable section and a second axis in an adjusted state in the first embodiment.

FIG. 4E shows the positional relationship between the second expandable/contractable section 522 and the second axis AX2 in the adjusted state in the first embodiment.

With respect to the unadjusted state, in which the end section 529 of the second expandable/contractable section 522 is located in the third plane P3, let θ1 be the tilt of the mirror 10 in the adjusted state in which the end section 529 is shifted by a distance Z1 from the third plane P3. Let L1 be the distance in the V direction from the second axis AX2 to the second expandable/contractable section 522.

Consider now a case where the temperature of the alignment adjuster, including the third holder 33*a*, the second support member 32*a*, and the second expandable/contractable section 522, rises with the second expandable/contractable section 522 remaining in the adjusted state achieved by the drive section 520. A distance L2 in the V direction from the second axis AX2 to the second expandable/contractable section 522 is greater than the distance L1 by a value according to a coefficient of thermal expansion ah of the first material of which the third holder 33*a* is made. On the other hand, a distance Z2 between the end section 529 and the third plane P3 is greater than the distance Z1 by a value according to a coefficient of thermal expansion am of the second material of which the second support member 32*a* and the second expandable/contractable section 522 are made. When the second material has a coefficient of thermal expansion smaller than that of the first material, the tilt of the mirror 10 is θ2 slightly smaller than θ1.

When the second expandable/contractable section 522 is in the unadjusted state, the end section 529 is located in the third plane P3, and θ1 and θ2 are therefore both 0, so that the tilt of the mirror 10 hardly changes even when the temperature of the alignment adjuster changes in the first embodiment. The tilt of the mirror 10 may, however, change when the temperature changes in the adjusted state shown in FIG. 4E.

Figure 4F:
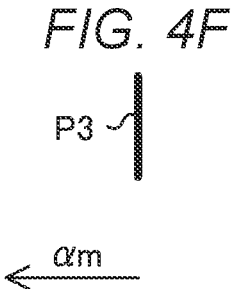
FIG. 4F shows the positional relationship between the second expandable/contractable section and the second axis in the adjusted state in the second embodiment.
Figure 4F:
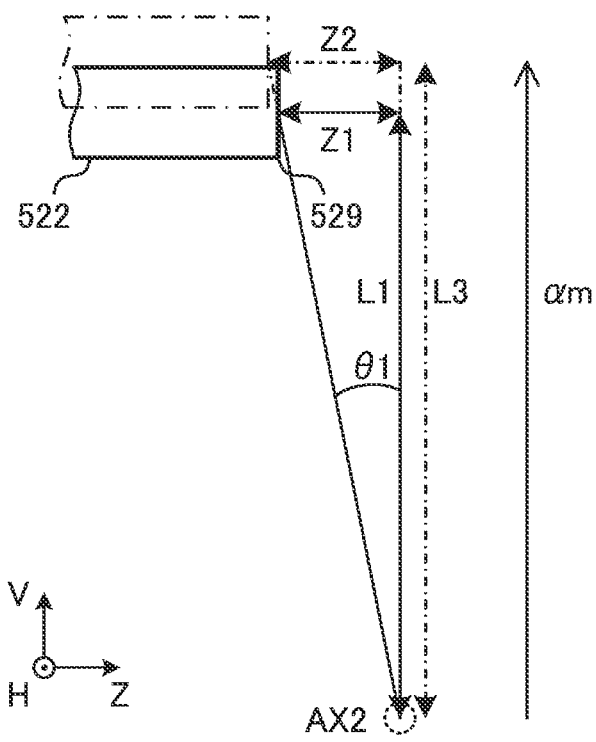
Figure 4F:

FIG. 4F shows the positional relationship between the second expandable/contractable section 522 and the second axis AX2 in the adjusted state in the second embodiment.

Consider a case where the temperature of the alignment adjuster rises with the second expandable/contractable section 522 remaining in the adjusted state achieved by the drive section 520, as in the case shown in FIG. 4E. In the second embodiment, a distance L3 in the V direction from the second axis AX2 to the second expandable/contractable section 522 is greater than the distance L1 by a value according to the coefficient of thermal expansion am of the second material of which the second support member 32*b* is made. On the other hand, the distance Z2 between the end section 529 and the third plane P3 is greater than the distance Z1 by a value according to the coefficient of thermal expansion am of the second material of which the second support member 32*b* and the second expandable/contractable section 522 are made. In this case, the tilt of the mirror 10 remains approximately at θ1 even when the temperature of the alignment adjuster rises.

The positional relationship between the second axis AX2 and the second expandable/contractable section 522 has been described above, and the same applies to the positional relationship between the first axis AX1 and the first expandable/contractable section 411.

According to the second embodiment, the second plane P2 containing the second end section 212 of the first support member 21*b* and the first axis AX1 is perpendicular to the first plane P1 containing the first end section 211 of the first support member 21*b* and the first axis AX1.

According to the configuration described above, in the adjusted state, in which the end section 419 of the first expandable/contractable section 411 is located outside the fifth plane P5, a change in the posture of the mirror 10 can be suppressed even when the temperature of the alignment adjuster including the first support member 21*b* and the first expandable/contractable section 411 changes.

According to the second embodiment, the alignment adjuster further includes the second holder 22*b*, made of the first material, which supports the first holder 11 at the first axis AX1 and further supports the first support member 21*b* both at the first end section 211 and the second end section 212.

Thus, supporting the first holder 11 at the first axis AX1 and supporting the first support member 21*b*, which supports the first adjuster 41, both at the first end section 211 and the second end section 212 are performed commonly by the second holder 22*b*. The posture of the mirror 10 can therefore be more stabilized.

According to the second embodiment, the fourth plane P4 containing the fourth end section 324 of the second support member 32*b* and the second axis AX2 is perpendicular to the third plane P3 containing the third end section 323 of the second support member 32*b* and the second axis AX2.

According to the configuration described above, in the adjusted state, in which the end section 529 of the second expandable/contractable section 522 is located outside the third plane P3, a change in the posture of the mirror 10 can be suppressed even when the temperature of the alignment adjuster including the second support member 32*b* and the second expandable/contractable section 522 changes.

According to the second embodiment, the alignment adjuster further includes the third holder 33*b*, made of the first material, which supports the second holder 22*b* at the second axis AX2 and further supports the second support member 32*b* both at the third end section 323 and the fourth end section 324.

Thus, supporting the second holder 22*b* at the second axis AX2 and supporting the second support member 32*b*, which supports the second adjuster 52, both at the third end section 323 and the fourth end section 324 are performed commonly by the third holder 33*b*. The posture of the mirror 10 can therefore be more stabilized.

According to the second embodiment, the second plane P2 containing the second end section 212 of the first support member 21*b* and the first axis AX1 is perpendicular to the fifth plane P5 containing the first axis AX1 and the second axis AX2.

According to the configuration described above, in the adjusted state, in which the end section 419 of the first expandable/contractable section 411 is located outside the fifth plane P5, a change in the posture of the mirror 10 can be suppressed even when the temperature of the alignment adjuster including the first support member 21*b* and the first expandable/contractable section 411 changes.

As for the other points, the second embodiment is the same as first embodiment.

4. Others

Figure 5:
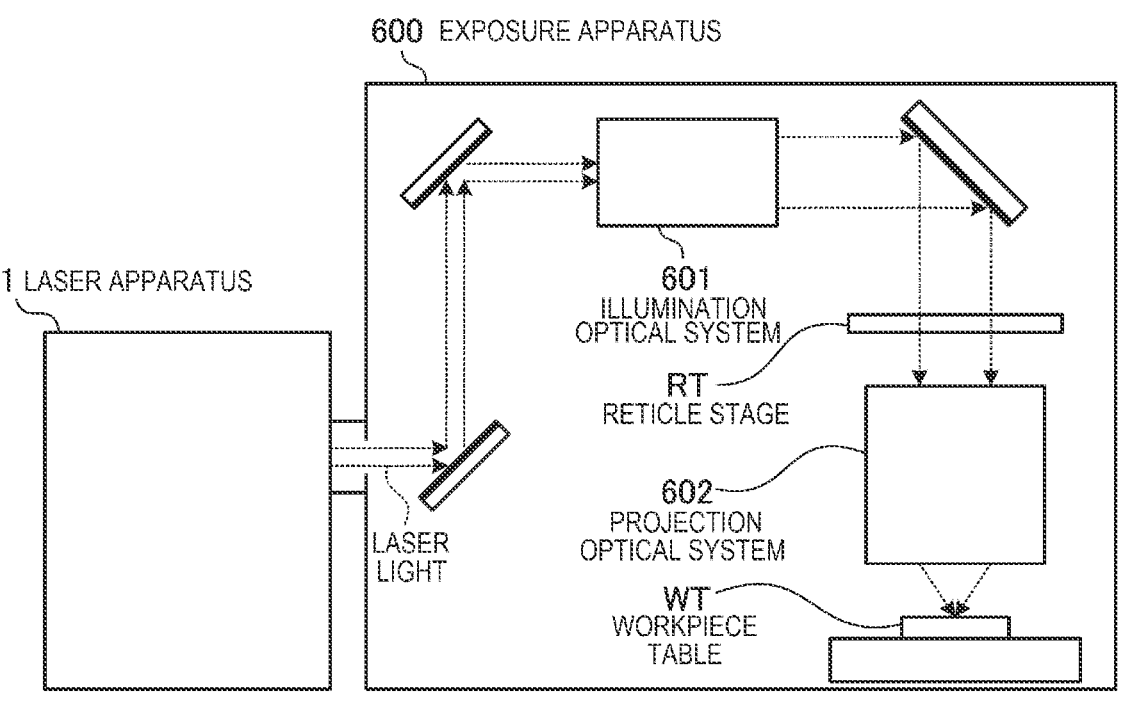
FIG. 5 schematically shows the configuration of an exposure apparatus connected to the laser apparatus.

FIG. 5 schematically shows the configuration of an exposure apparatus 600 connected to the laser apparatus 1. The laser apparatus 1 generates pulse laser light and outputs the pulse laser light to the exposure apparatus 600.

In FIG. 5, the exposure apparatus 600 includes an illumination optical system 601 and a projection optical system 602. The illumination optical system 601 illuminates a reticle pattern of a reticle that is not shown but is placed on a reticle stage RT with the pulse laser light having entered the exposure apparatus 600 from the laser apparatus 1. The projection optical system 602 performs reduction projection on the pulse laser light having passed through the reticle to bring the pulse laser light into focus on a workpiece that is not shown but is placed on a workpiece table WT. The workpiece is a light sensitive substrate onto which a photoresist has been applied, such as a semiconductor wafer. The exposure apparatus 600 translates the reticle stage RT and the workpiece table WT in synchronization with each other to expose the workpiece to the pulse laser light having reflected the reticle pattern. The exposure apparatus 600 can manufacture electronic devices by transferring the reticle pattern onto the semiconductor wafer in the exposure step described above and then carrying out a plurality of other steps.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. An alignment adjuster comprising:
a first holder made of a first material and configured to support an optical element;
a first adjuster including a first expandable/contractable section made of a second material different from the first material and configured to rotate the first holder and the optical element around a first axis by adjusting a length of the first expandable/contractable section with the first expandable/contractable section being in contact with the first holder; and
a first support member made of the second material and configured to support the first adjuster,
the first adjuster being configured to be capable of adjusting a position where the first expandable/contractable section and the first holder are in contact with each other to be located in a first plane containing a first end section of the first support member and the first axis,
wherein a second plane containing a second end section of the first support member and the first axis is perpendicular to the first plane.

2. The alignment adjuster according to claim 1, further comprising:
a second holder made of the first material and configured to support the first holder at the first axis and further support the first support member at the first end section.

3. The alignment adjuster according to claim 1, further comprising:
a second holder made of the first material and configured to support the first holder at the first axis and further support the first support member both at the first end section and the second end section.

4. The alignment adjuster according to claim 1, wherein the second material has a coefficient of thermal expansion smaller than a coefficient of thermal expansion of the first material.

5. The alignment adjuster according to claim 1, wherein the first material has a specific gravity smaller than a specific gravity of the second material.

6. The alignment adjuster according to claim 1, further comprising:
a second holder made of the first material and configured to support the first holder at the first axis and further support the first support member at the first end section;
a second adjuster including a second expandable/contractable section made of the second material and configured to rotate the second holder, the first holder, and the optical element around a second axis different from the first axis by adjusting a length of the second expandable/contractable section with the second expandable/contractable section being in contact with the second holder; and
a second support member made of the second material and configured to support the second adjuster.

7. The alignment adjuster according to claim 6, wherein the second adjuster is configured to be capable of adjusting a position where the second expandable/contractable section and the second holder are in contact with each other to be located in a third plane containing a third end section of the second support member and the second axis.

8. The alignment adjuster according to claim 7, further comprising:
a third holder made of the first material and configured to support the second holder at the second axis and further support the second support member at the third end section.

9. The alignment adjuster according to claim 7, wherein a fourth plane containing a fourth end section of the second support member and the second axis is perpendicular to the third plane.

10. The alignment adjuster according to claim 9, further comprising:
a third holder made of the first material and configured to support the second holder at the second axis and further support the second support member both at the third end section and the fourth end section.

11. The alignment adjuster according to claim 6, wherein the second plane is perpendicular to a fifth plane containing the first axis and the second axis.

12. An alignment adjuster comprising:
a first holder made of a first material and configured to support an optical element;
a first adjuster including a first expandable/contractable section made of a second material different from the first material and configured to rotate the first holder and the optical element around a first axis by adjusting a length of the first expandable/contractable section with the first expandable/contractable section being in contact with the first holder;
a first support member made of the second material and configured to support the first adjuster;
a second holder made of the first material and configured to support the first holder at the first axis and further support the first support member at a first end section of the first support member;

a second adjuster including a second expandable/contractable section made of the second material and configured to rotate the second holder, the first holder, and the optical element around a second axis that intersects with the first axis by adjusting a length of the second expandable/contractable section with the second expandable/contractable section being in contact with the second holder; and a second support member made of the second material and configured to support the second adjuster, the first end section being located in a fifth plane containing the first axis and the second axis.

13. The alignment adjuster according to claim 12, wherein a first plane containing the first end section and the first axis is perpendicular to a direction in which the first expandable/contractable section expands.

14. The alignment adjuster according to claim 12, further comprising:

a third holder made of the first material and configured to support the second holder at the second axis and further support the second support member at a third end section of the second support member.

15. The alignment adjuster according to claim 14, wherein the second expandable/contractable section is in contact with the second holder in the fifth plane.

16. The alignment adjuster according to claim 15, wherein a third plane containing the third end section and the second axis is perpendicular to a direction in which the second expandable/contractable section expands.

17. The alignment adjuster according to claim 12, wherein a second plane containing a second end section of the first support member and the first axis is perpendicular to a first plane containing the first end section of the first support member and the first axis.

18. The alignment adjuster according to claim 12, wherein a fourth plane containing a fourth end section of the second support member and the second axis is perpendicular to a third plane containing a third end section of the second support member and the second axis.

19. A method for manufacturing electronic devices, the method comprising:

generating pulse laser light by using a laser apparatus, outputting the pulse laser light to an exposure apparatus; and exposing a photosensitive substrate to the pulse laser light in the exposure apparatus to manufacture the electronic devices, the laser apparatus including an alignment adjuster including a first holder made of a first material and configured to support an optical element, a first adjuster including a first expandable/contractable section made of a second material different from the first material and configured to rotate the first holder and the optical element around a first axis by adjusting a length of the first expandable/contractable section with the first expandable/contractable section being in contact with the first holder, and a first support member made of the second material and configured to support the first adjuster, and the first adjuster being configured to be capable of adjusting a position where the first expandable/contractable section and the first holder are in contact with each other to be located in a first plane containing a first end section of the first support member and the first axis.

* * * * *